US011658582B2

(12) United States Patent
Bessegato et al.

(10) Patent No.: US 11,658,582 B2
(45) Date of Patent: May 23, 2023

(54) METHOD OF COMMUNICATION THROUGH A FLYBACK POWER TRANSFORMER USING A ZERO VOLTAGE SWITCHING PULSE IN CRCM MODE

(71) Applicant: Infineon Technologies Austria AG, Villach (AT)

(72) Inventors: Renato Bessegato, Oberhaching (DE); Andrey Malinin, Fort Collins, CO (US); Yong Siang Teo, Singapore (SG)

(73) Assignee: Infineon Technologies Austria AG, Villach (AT)

( * ) Notice: Subject to any disclaimer, the term of this patent is extended or adjusted under 35 U.S.C. 154(b) by 156 days.

(21) Appl. No.: 17/156,299

(22) Filed: Jan. 22, 2021

(65) Prior Publication Data

US 2022/0239233 A1    Jul. 28, 2022

(51) Int. Cl.
*H02M 3/335*     (2006.01)
*H02M 1/00*      (2006.01)

(52) U.S. Cl.
CPC ........... *H02M 3/33592* (2013.01); *H02M 3/33523* (2013.01); *H02M 1/0009* (2021.05); *H02M 1/0058* (2021.05)

(58) Field of Classification Search
None
See application file for complete search history.

(56) References Cited

U.S. PATENT DOCUMENTS

| 6,084,784 | A  | * | 7/2000  | Durbaum | H02M 3/33584 |
|           |    |   |         |         | 363/131      |
| 8,299,770 | B2 | * | 10/2012 | Qiu     | H02M 3/1588  |
|           |    |   |         |         | 323/283      |
| 9,608,532 | B2 | * | 3/2017  | Wong    | H02M 1/38    |
| 10,516,340| B1 | * | 12/2019 | Malinin | H02M 3/33592 |
| 2014/0160810 | A1 | * | 6/2014 | Zheng | H02M 3/33576 |
|           |    |   |         |         | 363/21.17    |
| 2014/0204619 | A1 | * | 7/2014 | Telefus | H02M 3/33576 |
|           |    |   |         |         | 363/21.01    |

(Continued)

OTHER PUBLICATIONS

Semiconductor Components Industries, "How to Keep a Flyback Switch Mode Supply Stable with a Critical-Mode Controller," AN1681/D, May 2017, 9 pp.

(Continued)

*Primary Examiner* — Jeffrey A Gblende
(74) *Attorney, Agent, or Firm* — Shumaker & Sieffert, P.A.

(57) ABSTRACT

Techniques to send digital information from the secondary side to the primary side of a power converter, such as a flyback power converter, without the need for a separate, isolated communication channel. The power converter of this disclosure may send digital information from secondary side to the primary side through a power transformer while the power converter operates in a mixed mode scenario, e.g. critical conduction mode (CRCM) and discontinuous conduction mode (DCM). In CRCM, a controller circuit for the power converter may encode digital information by modulating the diode conduction time in a switching cycle. In DCM, the controller circuit may encode digital information by modulating the period of time for each switching cycle, e.g. increased period, decreased period or no change to the period.

18 Claims, 14 Drawing Sheets

(56) References Cited

U.S. PATENT DOCUMENTS

2015/0188442 A1* 7/2015 Kesterson ......... H02M 3/33523
363/21.15

OTHER PUBLICATIONS

International Rectifier, "SmartRectifier Control IC," IR1167(A,B)S, Nov. 6, 2013, 25 pp.
Infineon Technologies, "Design guide for adaptor with XDPS21071," V 1.0, Nov. 6, 2019, 31 pp.
Power Integrations Inc, "Designing AC to DC Flyback Converters using TOPSwitch-GX," Mar. 24, 2004, 67 pp.
U.S. Appl. No. 16/794,093, filed Feb. 18, 2020, naming inventors Bessegato et al.

* cited by examiner

METHOD OF COMMUNICATION THROUGH A FLYBACK POWER TRANSFORMER USING A ZERO VOLTAGE SWITCHING PULSE IN CRCM MODE

TECHNICAL FIELD

The disclosure relates to power converters, and more specifically control circuitry for isolated power converters.

BACKGROUND

Some examples of power converters may be configured to operate in continuous conduction (CCM) and discontinuous conduction modes (DCM). Each cycle, energy input to the power converter is stored, then released to an output of the power converter, e.g., a load. In DCM, the energy is used up each cycle with a waiting period for the next cycle to before adding more energy to a storage element of the power converter from the input. Therefore, current in the storage element ramps up and down and reaches zero before the end of the cycle. In other words, in DCM the current stops for some period each switching cycle, therefore the term 'discontinuous.' In CCM, not all the stored energy is used up each cycle. The current in the storage element ramps up and down each cycle but never going to zero, therefore 'continuous' current. In some examples a power converter will operate in DCM for a light load, and in CCM when the power demand from the load is above a threshold power. The load level where the mode changes from CCM to DCM is the critical conduction mode point (CRCM).

SUMMARY

In general, the disclosure describes techniques to send digital information from the secondary side to the primary side of a power converter, such as a flyback power converter without the need for a separate, isolated communication channel. The power converter of this disclosure may send digital information from secondary side to the primary side through a power transformer while the power converter operates in a mixed mode scenario, e.g. critical conduction mode (CRCM) and discontinuous conduction mode (DCM). In CRCM, a controller circuit for the power converter may encode digital information by modulating the diode conduction time in a switching cycle. In DCM, the controller circuit may encode digital information by modulating the period of time for each switching cycle, e.g. increased period, decreased period or no change to the period.

In one example, this disclosure describes a method comprising controlling, by a secondary side controller, a diode conduction time by controlling a switching time of a synchronous rectification (SR) switch of an isolated power converter, wherein the isolated power converter comprises a power transformer; encoding, by the secondary side controller, digital information by modulating a duration of the diode conduction time; detecting, by a primary side controller of the isolated power converter, the duration of the diode conduction time; decoding, by the primary side controller, the digital information based on the duration of the diode conduction time.

In one example, this disclosure describes a system that includes an isolated power converter comprising a power transformer and a secondary side controller configured to control a synchronous rectification (SR) switch of the power converter. The secondary side controller is configured to control a diode conduction time by controlling a switching time of the SR switch and encode digital information by modulating a duration of the diode conduction time. The system further includes a primary side controller configured to: control a primary side switch of the power converter, detect the duration of the diode conduction time and decode the digital information based on the duration of the diode conduction time.

In another example, this disclosure describes a device comprising a primary side controller configured to: control a primary side switch of an isolated power converter, detect a duration of a diode conduction time for the isolated power converter and decode the digital information based on the duration of the diode conduction time.

In another example, this disclosure describes a device comprising a secondary side controller configured to control a synchronous rectification (SR) switch of an isolated power converter, wherein: the secondary side controller is configured to control a diode conduction time of the isolated power converter time by controlling a switching time of the SR switch, and encode digital information by modulating a duration of the diode conduction time.

The details of one or more examples of the disclosure are set forth in the accompanying drawings and the description below. Other features, objects, and advantages of the disclosure will be apparent from the description and drawings, and from the claims.

DETAILED DESCRIPTION

The disclosure describes techniques to send digital information from the secondary side to the primary side of a power converter, such as a flyback power converter without the need for a separate, isolated communication channel. The power converter of this disclosure may send digital information from secondary side to the primary side through a power transformer while the power converter operates in a mixed mode scenario, e.g. critical conduction mode and discontinuous conduction mode. In CRCM, a controller circuit for the power converter may encode digital information by modulating the diode conduction time in a switching cycle. In DCM, the controller circuit may encode digital information by modulating the period of time for each switching cycle, e.g. increased period, decreased period or no change to the period.

This disclosure further describes techniques for the primary side controller to signal the secondary side controller that the primary side controller correctly received a digital communication. The acknowledge/non-acknowledge techniques of this disclosure are configured such that the secondary side controller will always force a skip switching cycle after the end of the message transmission, e.g., will not generate a zero voltage switching (ZVS) pulse. In other words, during a digital communication period, the secondary side controller will skip a cycle at the end of a message transmission no matter the state of the output voltage. At the end of receiving a message transmission, the primary side controller may generate a control pulse for the primary side switch to indicate an acknowledgement of message receipt. The secondary side controller may detect the control pulse. Detecting a primary side control pulse in a skip switching period indicates to the secondary side controller that the primary side controller correctly received the digital message, e.g. an ACK. The terms, "switching cycle," "switching period" and "timing period" may be used interchangeably in this disclosure.

The techniques of this disclosure communicate through the transformer but retain galvanic isolation between the primary side and secondary side and require no additional communication device or channel. The techniques of this disclosure also do not need additional components beyond those components already part of the power converter. Also, unlike other communication methods that communicate across the power transformer, the techniques of this disclosure support ZVS and constant frequency modes and support both DCM and continuous conduction mode (CCM) as well as a variety of primary side control techniques such peak current control or time-based pulse width modulation (PWM).

Figure 1:
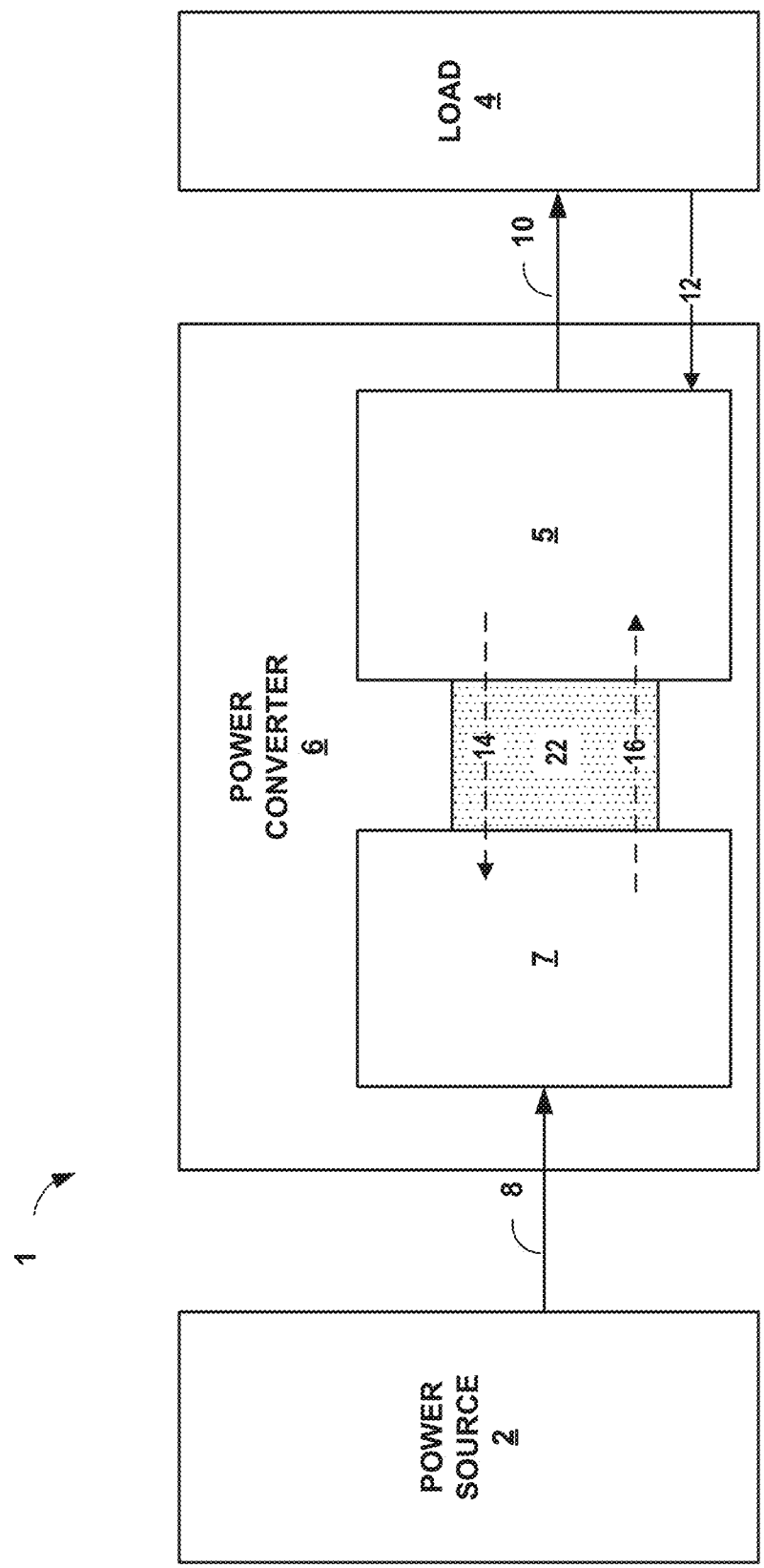
FIG. 1 is a block diagram illustrating an example system for converting power from a power source and configured to communicate between a primary side and secondary side, in accordance with one or more aspects of the present disclosure.

FIG. 1 is a block diagram illustrating an example system for converting power from a power source and configured to communicate a between a primary side and a secondary side, such as across a power transformer, in accordance with one or more aspects of the present disclosure. FIG. 1 shows system 1 as having four separate and distinct components shown as power source 2, power converter 6, and load 4, however system 1 may include additional or fewer components. For instance, power source 2, power converter 6, and load 4 may be four individual components or may represent a combination of one or more components that provide the functionality of system 1 as described herein.

System 1 includes power source 2, which provides electrical power to system 1. Power source 2 may be an alternating current (AC) or direct current (DC) power source. Numerous examples of power source 2 exist and may include, but are not limited to, power grids, generators, transformers, batteries, solar panels, windmills, regenerative braking systems, hydro-electrical or wind-powered generators, or any other form of devices that are capable of providing electrical power to system 1.

The example of system 1 includes power converter 6 which may operate as a flyback power converter that converts one form of electrical power provided by power source 2 into a different, and usable form of electrical power for powering load 4. Power converter 6 is shown having primary side 7 separated by transformer 22 from secondary side 5. In some examples, transformer 22 may include more than one transformer or sets of transformer windings configured to transfer energy from source 2 to load 4. Using transformer 22 and the components of primary side 7 and secondary side 5, power converter 6 can convert the power input at link 8 into a power output at link 10. A flyback power converter is a type of isolated power converter.

Load 4 (also sometimes referred to herein as device 4) receives the electrical power converted by power converter 6. In some examples, load 4 may use electrical power from power converter 6 to perform a function.

Power source 2 may provide electrical power with a first voltage level and current level over link 8. Load 4 may receive electrical power that has a second voltage and current level, converted by power converter 6 over link 10. Links 8 and 10 represent any medium capable of conducting electrical power from one location to another. Examples of links 8 and 10 include, but are not limited to, physical and/or wireless electrical transmission mediums such as electrical wires, electrical traces, conductive gas tubes, twisted wire pairs, and the like. Each of links 8 and 10 provide electrical coupling between, respectively, power source 2 and power converter 6, and power converter 6 and load 4.

In the example of system 1, electrical power delivered by power source 2 can be converted by converter 6 to power that has a regulated voltage and/or current level that meets the power requirements of load 4. For instance, power source 2 may output, and power converter 6 may receive, power which has a first voltage level at link 8. Power converter 6 may convert the power which has the first voltage level to power which has a second voltage level that is required by load 4. Power converter 6 may output the power that has the second voltage level at link 10. Load 4 may receive the converted power that has the second voltage level at link 10 and load 4 may use the converted power having the second voltage level to perform a function (e.g., power a microprocessor, charge a battery, etc.). In some examples the second voltage level may by greater than, less than or approximately the same as the first voltage level.

In operation, power converter 6 may control the level of current and voltage at link 10 by exchanging information between secondary side 5 and primary side 7, via transformer 22, which is depicted by communication link 14. Communication link 14 is not a dedicated communication link. Instead, as described herein, converter 6 is configured to pass information, from secondary side 5, via transformer 22, to primary side 7. In other words, rather than include an additional, electrically isolated communication link, which may be used by other flyback converters to transfer information between two sides of a flyback, converter 6 is configured to control the switching time of an SR switch on the secondary side 5. Secondary side 5 may encode digital information by modulating a period between the switching time of a synchronous rectification switch as a way to send information from secondary side 5 to primary side 7. In some examples, secondary side 5 may receive digital information from load 4, or other sources, via communication link 12. In other words, during digital communication, secondary side 5 may send digital information via a digital message to primary side 7.

A flyback power converter may operate in several modes. In some examples, a flyback converter may operate in any of three different modes. During a switching cycle, when the primary side switch in primary side 7 turns on, or starts conducting, current ramps up through the primary side of transformer 22 and transformer 22 begins storing energy in the primary side coil. When the primary side switch turns off, transformer 22 transfers power to the secondary coil and the secondary current ramps down. If the primary side switch is switched ON again during the ramp down cycle, before the current on the secondary side reaches zero, the power converter is operating in continuous conduction mode (CCM). Power converter 6 may operate in CCM when load 4 demands a relatively high power.

In examples in which the energy storage capability of the coils of transformer 22, and the power demand from load 4 is relatively low, the secondary side current may reach zero during the primary switch OFF time. When the secondary current reaches zero during the switching cycles, power converter 6 operates in discontinuous conduction mode. The amount of dead-time where the current stays at a null level may increase as the demand for power from load 4 decreases.

When the secondary current through the coil reaches zero and the switch turns ON immediately (no dead-time), the converter operates in critical conduction mode (CRCM). Power converter 6 may operate in CRCM during transitions between CCM and DCM. With no dead-time in a switching cycle, secondary side 5 may not be able to reliably modulate the switching cycle time to send digital messages to primary side 7. Therefore, during CRCM, e.g., a mixed mode scenario, CRCM mode and DCM, secondary side 5 may modulate the diode conduction time in a switching cycle and the period between two switching cycles to send digital information to primary side 7.

In some examples, by modulating the amount of time between the edges of pulses initiated by a synchronous rectification (SR) transistor on the secondary side 5, the power converter circuit of this disclosure may communicate digital information to the primary side 7 from the secondary side 5, e.g. during DCM. In some examples, the signals generated by the secondary side may be synchronized to portions of the switching cycle. For example, a signal, such as a pulse, may be synchronized to a zero crossing time, such as a zero voltage switching pulse.

The power converter circuit of this disclosure may include stable, accurate and reliable pulse detection techniques on the primary side 7 to determine slight changes in the period between pulses from the secondary side 5. During discontinuous conduction mode (DCM), the controller circuit on the secondary side may encode digital information by modulating the pulse period, e.g. increased period, decreased period or no change to the period.

Communication link 16 shows communication in the opposite direction, from the primary side 7 to the secondary side 5. As described above for communication link 14, communication link 16 is not a separate communication link. Instead, primary side 7 may acknowledge receipt of digital communication from secondary side 5 by sending an ACK that may be detected by secondary side 5. During DCM operation, in response to detecting a ZVS pulse on secondary side 5, primary side 7 may output a PWM pulse to control the current through primary side 7. A controller on secondary side 5 may detect the PWM pulse by monitoring the current flowing through secondary side 5. However, While in DCM, during communication, secondary side 5 may skip a cycle after secondary side 5 sends the last bit of a message. In some examples, e.g. while operating with zero-voltage switching, secondary side 5 may output a ZVS pulse for each switching cycle. However, after sending the final part of a message, secondary side 5 may skip the cycle, e.g., withhold the ZVS pulse. Primary side 7 may detect a ZVS pulse on the secondary side, or a skipped pulse, by monitoring the output voltage reflected through transformer 22. After successfully receiving and verifying a digital message from secondary side 5, primary side 7 may force the output of the PWM pulse for one switching cycle, even though primary side 7 did not detect the ZVS pulse.

In the example of FIG. 1, secondary side 5 may detect the PWM pulse based on a change, or lack of change, in the monitored secondary side current. Detecting a subsequent PWM pulse in the absence of a ZVS pulse at the end of a digital message may indicate to secondary side 5 that primary side 7 acknowledged the digital message. In other words, that primary side 7 sent an ACK in response to receiving the complete digital message.

In other examples, primary side 7 may not receive the digital information sent by secondary side 5, or a validation code for the message may be invalid, or the primary side may not be able to interpret the digital information, or some other error. Some examples of validation codes may include a cyclic redundancy check (CRC) code, Bose-Chaudhuri-Hocquenghem (BCH) error correction or other similar validation techniques. In response to an improper digital message, or if primary side 7 does not receive a message, then primary side 7 may continue normal operation. In other words, primary side 7 may skip the PWM pulse based on not detecting the skipped (e.g. withheld) ZVS pulse, or other pulse from secondary side 5. In this disclosure, the delayed pulse for one switching cycle may also be referred to as a skipped pulse.

In response to sending digital information and withholding a ZVS pulse when operating in ZVS mode, but not detecting a forced PWM pulse from primary side 7, the secondary side may determine that the sent digital information was not received by primary side 7. In some examples, failure to send an ACK by primary side 7 may be considered as sending a no-ACK, or NACK. Secondary side 5 may then re-send the digital information or take some other action. For example, after a specified number of attempts to send digital information, but receiving no ACK from primary side 7, secondary side 5 may output an error message to a system communication link.

During DCM, primary side 7 may detect changes in the period between the switching time of the SR switch via transformer 22. Primary side 7 may decode the digital information based on the modulated period between the switching time of the SR switch. Some examples of digital information transferred between for example, to communicate to primary side 7, that load 4 requires additional energy from source 2, to communicate temperature and other operating parameters of load 4, or any other information that may be digitally encoded.

Figure 2:
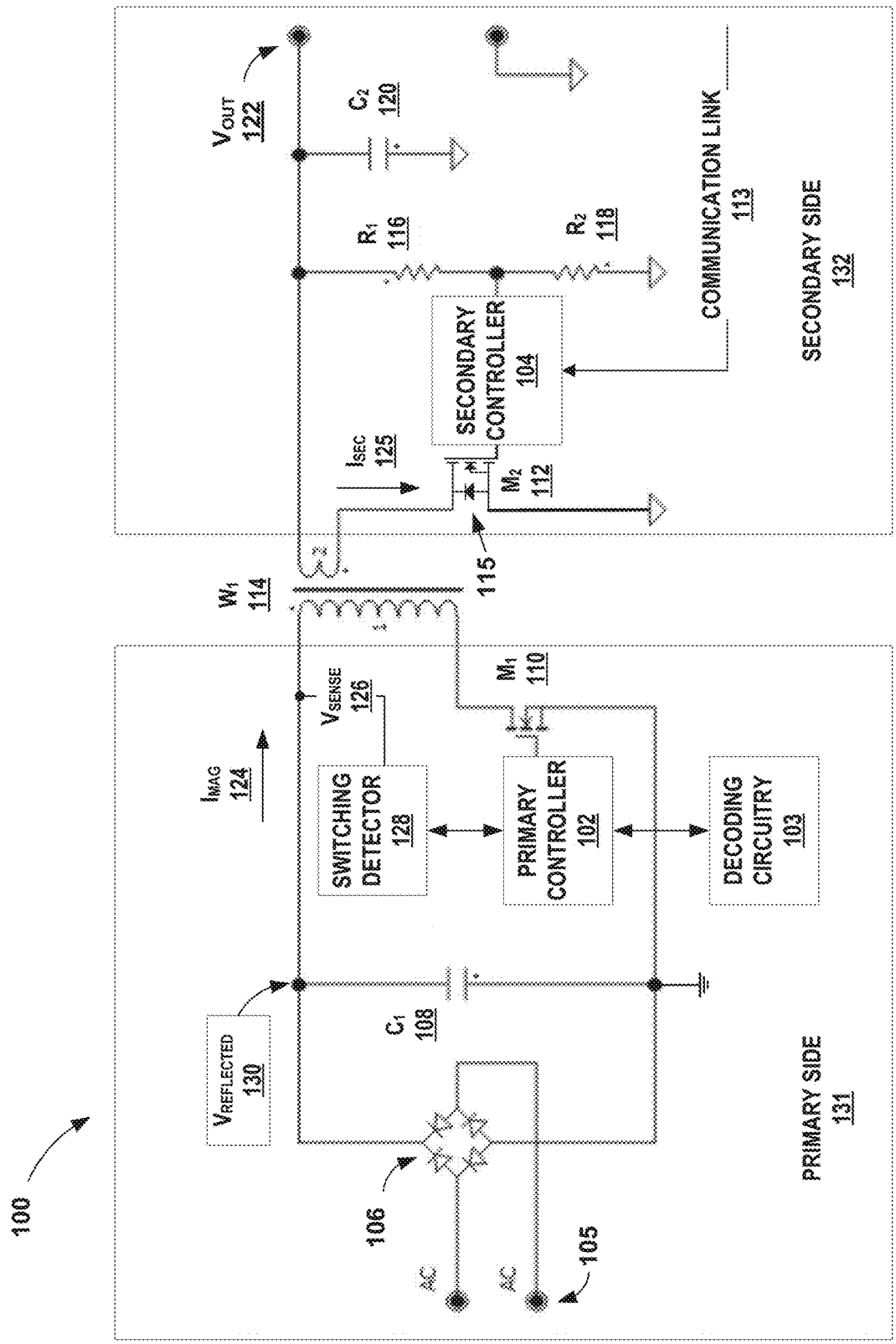
FIG. 2 is a schematic diagram illustrating an example power converter circuit according to one or more techniques of this disclosure.

FIG. 2 is a schematic diagram illustrating an example power converter circuit according to one or more techniques of this disclosure. Power converter 100 is system that is an example of power converter 6 described above in relation to FIG. 1. To simplify the description, the example of FIG. 2 will focus on a flyback power converter operating with ZVS switching. However, as described above in relation to FIG. 1, other types of signals generated by the secondary side may also apply to the techniques of this disclosure.

In the example of FIG. 2, power converter 100 includes a transformer, W1 114, primary side 131 and secondary side 132, similar to system 1 described above in relation to FIG. 1. As described above in relation to FIG. 1, for communication of digital data, power converter 100 may operate in a mixed DCM and CRCM mode. The description of power converter 100 in disclosure may include techniques that use an edge of an SR switch initiated ZVS pulse to send digital information from secondary side 132 to primary side 131 of power converter 100 in DCM. Also, in CRCM secondary side 132 may communicate with primary side 131 by controlling the diode conduction time. Primary side 131 may send an ACK to secondary side 132 in response to receiving digital information. As described above in relation to FIG. 1, primary side 131 may force a PWM pulse to the control terminal of primary switch M1 110, even though primary side 131 does not detect the ZVS pulse, because secondary side 132 skipped the ZVS pulse at the end of the digital communication. A withheld PWM pulse from primary controller 102 at the end of a digital message may indicate a NACK to secondary side 132.

Primary side 131 includes diode rectifier 106, capacitor C1 108, pulse detector 128, primary controller 102 and primary side switch M1 110. Rectifier 106 receives AC power from AC input terminals 105 and connects to primary side capacitor C1 108. Primary controller 102 controls the gate of primary side switch M1 110. Primary side switch connects one terminal of the primary winding of transformer W1 114 to a primary side ground node. Pulse detector 128 monitors the reflected voltage, $V_{REFLECTED}$ 130 through a voltage sensing input $V_{SENSE}$ 126. Reflected voltage $V_{REFLECTED}$ 130, in the example of FIG. 2 is the output voltage $V_{OUT}$ 122 as scaled by the turns ratio of the transformer. A load across the secondary winding of a transformer appears to the primary side 131 as a reflected load having a value dependent on the reciprocal of the turns ratio squared. Similarly, magnetizing current in the primary winding is reflected in the secondary winding and scaled by the turns ratio. Secondary controller 104 may detect signals from primary controller 102 by measuring the reflected current in the secondary winding.

In the example of FIG. 2, primary side switch M1 110 is shown as a metal oxide semiconductor field effect transistor (MOSFET) with a gate as the control terminal. In other examples, primary side switch M1 110 may be implemented as a different type of switch, such as an insulated gate bipolar transistor (IGBT). In other examples, primary side 131 may be configured to receive DC power input and may not include rectifier 106.

In the example of FIG. 2, secondary side 132 includes SR switch M2 112, secondary controller 104, a resistor divider that includes R1 116 and R2 118, and output capacitor C2 120. A first terminal of the secondary side of transformer W1 114 connects to the output terminal, $V_{OUT}$ 122 as well as to one terminal of resistor R1 116. The opposite terminal of resistor R1 116 connects to secondary controller 104. Resistor R2 118 connects secondary controller 104 and the opposite terminal of resistor R1 116 to the secondary side ground. Secondary controller 104 monitors output voltage $V_{OUT}$ 122 through the resistor divider formed by resistors R1 116 and R2 118. Output capacitor C2 120 connects Vout 122 to the secondary side ground. In some examples, the secondary side ground may be different from the primary side ground.

Transformer W1 114 isolates primary side 131 of power converter 100 from secondary side 132 as well as steps up or steps down the secondary side voltage based on the turn ratio between the primary winding and the secondary winding. The turn ratio may define the number of electrical windings (turns) in the primary winding relative to the number of electrical windings (turns) in the secondary winding. In some examples, transformer W1 114 may also include one or more auxiliary windings (not shown in FIG. 2).

In a synchronous power converter, such as power converter 100, secondary side rectification is performed by an SR switch, such as SR switch M2 112. Synchronous rectification may also be called active rectification and may have advantages over the use of diode rectification on the secondary side of a power converter in some applications. Secondary controller 104 may drive the gate pin of the SR switch M2 112 as needed to rectify the signal from the secondary side of transformer W1 114. In other words, secondary controller 104 causes SR switch M2 112 to act as a rectifier and actively turn on to allow current in one direction but actively turn off to block current from flowing the other direction, i.e. to act as an ideal diode. In some examples secondary controller 104 may be considered a SR controller.

Primary side switch M1 110 and SR switch M2 112 may be driven in a complimentary manner. In other words, when primary side switch M1 110 is ON, then SR switch M2 112 may be OFF, and vice versa. The techniques of this disclosure apply to power converters operating in continuous conduction mode, discontinuous conduction mode or critical conduction mode. In examples in which SR switch M2 112 is a FET and when SR switch M2 112 is off, current from the secondary winding, Isec 125, may flow through the body diode 115 of SR switch M2 112. A body diode for a FET may have a larger voltage drop than the source-to-drain voltage ($V_{DS-ON}$) when the FET is turned ON. To improve the system efficiency, SR switch M2 112 may be turned ON prior to the next switching cycle for a pre-defined period of time to allow secondary side current Isec 125 to flow with a reduced voltage drop. During the time SR switch M2 112 is turned on, some energy from output capacitor C2 120 is stored in the transformer magnetizing inductance. When SR switch M2 112 is turned OFF, the resulting magnetizing current, Imag 124 recharges the primary side parasitic capacitance, which causes primary switch M1 110 to turn ON when detecting zero voltage as measured at $V_{SENSE}$ 126. The primary side parasitic capacitance may include parasitic capacitance of the transformer, as well as parasitic drain-source capacitance (Cds) of primary switch M1 110. In other words, in this manner primary side controller 102 may detect the ZVS event and initiates a switching cycle. The falling edge of a ZVS pulse at primary side 131 is consistently aligned with SR switch M2 112 turn off at secondary side 132 and can be reliably detected by pulse detector 128, which is in communication with primary side controller 102. Controlling the primary side switch M1 110 to switch ON when detecting zero volts is called ZVS operation.

For communications, secondary controller 104 may receive digital information to be sent from secondary side 132 to primary side 131. In some examples, secondary controller 104 may receive the information via communication link 113 from, for example a load, another processor in a system that may include power converter 100, or some other source. Communication link 113 may be implemented by signal wires, wireless link, load modulation, and similar communication techniques. Communication link 113 may carry information, including digital information, similar to communication link 12 and load 4 as described above in relation to FIG. 1. Secondary controller 104 may also receive information to encode from sources other than the load, such as from temperature sensors, from a processor (e.g. a microcontroller), or other sources. Secondary controller 104 may encode the received information into digital information by modulating a period between the switching time of the SR switch while in DCM and modulating the diode conduction time of the body diode of SR switch M2 112 while in CRCM. The "diode conduction time" refers to the time during which body diode 115 of SR switch M2 112 is conducting while SR switch M2 112 is OFF. When M2 112 is OFF and the body diode 115 conducts, $V_{DS}$ of M2 112 is higher because the voltage drop of the body diode is greater than $V_{DS\_ON}$ of M2 112. Increased $V_{DS}$ of M2 impacts Vout 122 which the primary side controller can detect via reflected voltage Vsense 126. Therefore, primary controller 102 may detect diode conduction time using Vsense 126.

In some examples, the modes of operation for a flyback circuit differ mainly for the turn-off phase of SR switch M2 112. The turn-on phase of SR switch M2 112 corresponds to the turn-off phase primary side switch M1 110. The turn-on phase of SR switch M2 112 is identical for DCM, CCM and CRCM. When secondary controller 104 initiates the conduction phase (turn-on) of SR switch M2 112, current will start flowing through body diode 115, generating a negative VDS voltage across M2 112. Body diode 115 may have a higher voltage drop than the one caused by the MOSFET on resistance ($R_{DS-ON}$) and therefore may trigger a turn-on threshold for M2 112 in secondary controller 104. Secondary controller 104 may drive the gate of M2 112 to turn ON M2 112, which will in turn cause the conduction voltage $V_{DS}$ across M2 112 to decrease. This voltage decrease may be accompanied by some amount of ringing at Vout 122.

In either DCM or CRCM, once the SR MOSFET, M2 112, has been turned on, M2 112 may remain on until the rectified current, Isec 125 decays to the level where $V_{DS}$ for M2 112 crosses a turn-off threshold for secondary controller 104. The turn-off threshold within secondary controller 104 may be different depending on the mode of operation. In DCM the current may cross the turn-off threshold with a relatively low dI/dt. Once secondary controller 104 determines the current crossed the turn-off threshold and shuts off M2 112, current Isec 125 may start flowing again through body diode 115, causing the $V_{DS}$ across M2 112 voltage to step down to a negative voltage and begin to increase toward a positive voltage. Once $V_{DS}$ becomes positive, secondary controller 104 may be ready for next conduction cycle. In CCM mode the turn-off transition is steeper and dI/dt involved is higher. During M2 112 conduction phase in CCM, the current, Isec 125 may decay linearly, and so will $V_{DS}$.

In DCM, by definition, a third state is present whether neither body diode 115 or SR switch M2 112 switch conduct, and the inductor current, i.e. Isec 125, is null. DCM allows the magnetic flux in the transformer core to reset to zero before the next switching cycle begins. This idle time may allow primary controller 102 to lengthen the duty cycle of the PWM signal to M1 110 in presence of a step load increase without lowering the diode conduction time. Also, on primary side 131, pulse detector 128 may detect the ZVS pulse in the reflected voltage, $V_{REFLECTED}$ 130 sensed on the primary winding of power transformer W1 114. Decoding circuitry 103 may be configured to receive digital information based on the detected ZVS pulse and decode the digital information, including applying a validation algorithm to the received digital information. Though shown as separate from primary controller 102 and operatively connected to primary controller 102, in some examples decoding circuitry 103 may be included as part of primary controller 102 (not shown in FIG. 2). Secondary controller 104 may use a variety of coding schemes to encode the received information into digital information.

As described above in relation to FIG. 1, to acknowledge receipt and correct decoding of the digital information, primary controller 102 may output an ACK detectable by secondary controller 104. During DCM operation either while sending a digital message, or while operating without sending a digital message, secondary controller 104 may initiate zero voltage switching by controlling a switching time of SR switch M2 112 to cause a ZVS pulse. However, in response to sending a final bit of the digital information, secondary controller 104 may withhold the ZVS pulse, even though the output voltage and current measured by secondary controller 104 at Vout 122 may indicate that secondary controller 104 should output a ZVS pulse.

Similarly, during DCM operation either while receiving a digital message, or while operating without any message being sent, primary controller 102, in response to detecting the ZVS pulse, may control primary side switch M1 110 by outputting a control signal, e.g. a PWM pulse, to the gate of M1 110 during a switching period to turn on M1 110 and cause current to flow in the primary winding of transformer W1 114. However, in response to receiving the final bit of the digital information and decoding the digital information, primary controller 102 may output the control signal to primary side switch M1 110 without detecting the ZVS pulse. In other words, for a subsequent switching cycle after receiving and decoding digital information from secondary side 132, primary side controller 102 may output the control signal pulse for the switching cycle, without being triggered by detecting a ZVS pulse from secondary side 132. Secondary controller 104 may detect that primary side controller 102 output the control signal pulse and interpret the control signal pulse as an acknowledgement (ACK) that primary side 131 correctly received the digital information.

In some examples, secondary controller 104 may not be configured to deliver a ZVS pulse during every cycle. For example, when the load connected to Vout 122 is in a low-power state, such as a sleep mode or similar low-power state, secondary controller 104 may skip generation of the ZVS pulse for one or more switching cycles because secondary controller 104 may detect that reduced power is needed from primary side 131. However, during digital communication, secondary controller 104 may override the status of Vout and provide a ZVS pulse during each cycle, even when the load is in a low-power state. In other words, the "no ZVS pulse skipping" behavior from secondary controller 104 may be implemented only during times of digital communication. At other times, when secondary side 132 does not need to send digital communication to primary side 131, secondary side 132 may skip ZVS pulses during selected switching cycles as needed, such as when the load is in a sleep state. However, as noted above, secondary controller 104 may skip a cycle at the end of a digital message, whether the load is in a low power state or a higher power demand state.

During DCM, pulse detector 128 may detect and measure the small changes in time period, e.g. reduced time period and extended time period, and decode the digital information encoded by secondary controller 104. In other words, pulse detector 128 may detect the switching time of the SR switch and decode the digital information based on the modulated period between the switching time of the SR switch. Though pulse detector 128 is depicted as a block separate from primary controller 102, in some examples pulse detector 128 may be included within primary controller 102. In some examples, pulse detector 128 may sense a different voltage than $V_{REFLECTED}$ 130, such as the drain-source voltage of primary side switch M1 110 or a voltage across an auxiliary winding of transformer W1 114.

In response to the isolated power converter of power converter 100 entering critical conduction mode, the secondary side controller 104 is configured to control a diode conduction time of body diode 115 to encode digital information to primary side controller 102 instead of modulating the time period of the switching cycle as is done during DCM. As described above as well as in relation to FIG. 1, secondary side controller 104 may control the diode conduction time of body diode 115 by controlling a switching time of SR switch M2 112.

In some examples, primary side controller 104 may extend duration of the diode conduction time such that the diode conduction time is longer than a threshold duration. In other examples, secondary side controller 104 may set the diode conduction time to less than the threshold duration. Secondary side controller 104 may encode digital ONE, digital ZERO, or other digital symbol based on the relation of the diode conduction time to the predetermined threshold duration. As one example, to encode the digital ONE the secondary side controller may extend duration of the diode conduction time such that the diode conduction time is longer than the threshold duration. To encode the digital ZERO, the secondary side controller may set the diode conduction time to less than the threshold duration. In other examples, a diode conduction time less than the threshold duration may indicate a digital ONE, or another digital symbol. In some examples, secondary controller 104 may send the digital symbol, e.g. a ONE or ZERO, over two or more switching cycles.

Figure 3A:
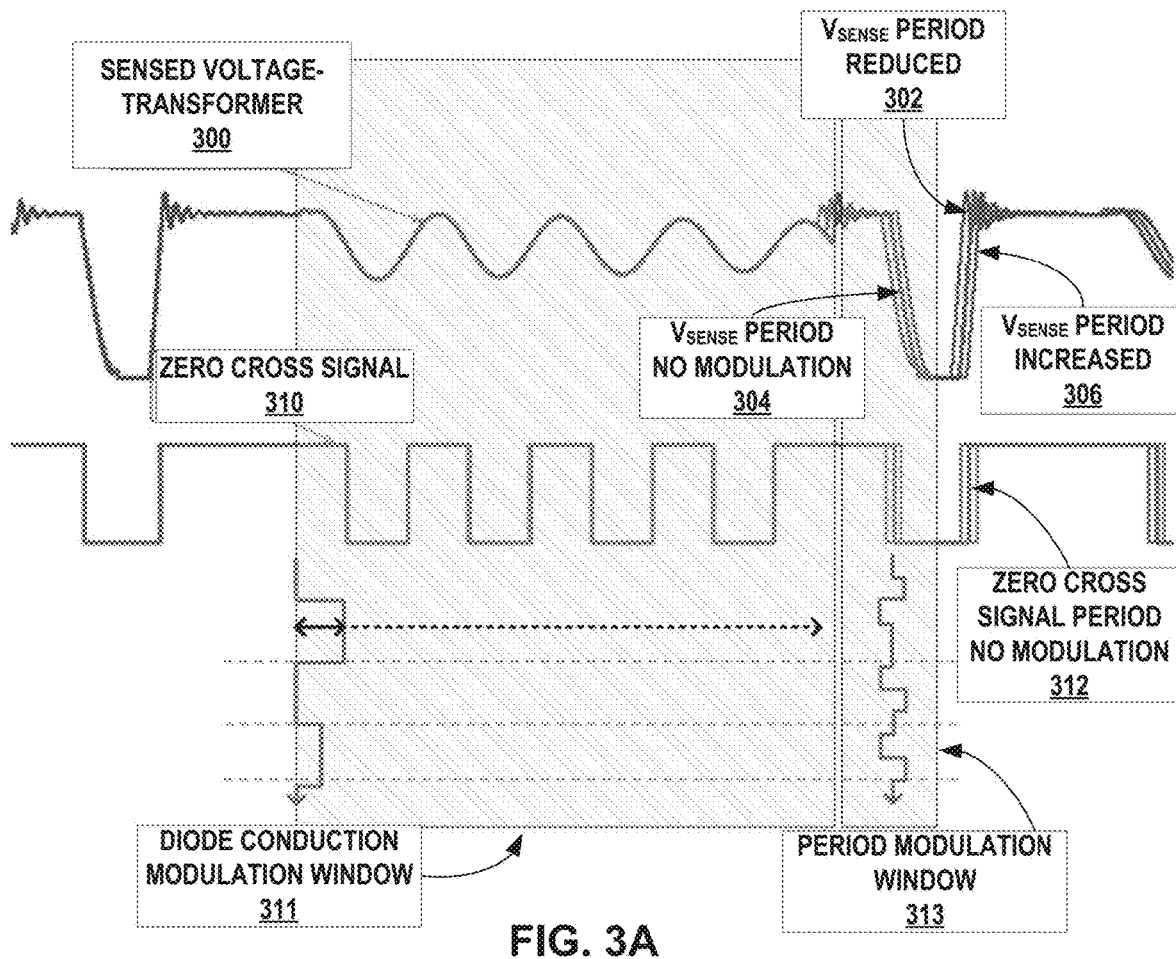
FIG. 3A is a timing diagram illustrating an example switching cycle with period modulation and diode conduction modulation.

FIG. 3A is a timing diagram illustrating an example switching cycle with period modulation and diode conduction modulation. As described above in relation to FIGS. 1 and 2, in some examples, the isolated power supply of this disclosure may communicate across the galvanic isolation of the transformer by modulating the switching period. For example, the primary controller may sense the reflected transformer voltage (300) and include timing circuitry that may sense small timing changes in the switching period. For example, the primary controller may detect an increased period (306), a reduced period (302) or no change in period (304). In some examples, an increased period (306) may indicate a first digital symbol, e.g., a digital ONE, while a decreased period (302) may indicate a digital ZERO. In other examples the increased period (306), reduced period (302) or no change in period (304) may transfer digital messages across the transformer using one or more coding techniques, e.g., Manchester encoding.

The secondary controller may combine the period modulation with diode conduction modulation to send the digital information from the secondary side to the primary side of the fly-back power transformer. In other words, the secondary controller may encode the digital information into diode conduction time of during the diode conduction modulation window 311 of the switching cycle. The secondary controller may also encode digital information in the modulation time between the falling edges of the ZVS pulses during the period modulation window 313 of the switching cycle.

The digital communication techniques of this disclosure may be based on system elements that may be included in a flyback off-line power supply. One example of such an element may include a power stage with a synchronous rectifier in the flyback configuration, e.g. an SR MOSFET instead of an output rectifier diode. The SR MOSFET may include a body diode, as described above in relation to FIG. 2. The flyback power converter of this disclosure may operate the power stage working in ZVS mode with a fixed frequency. The primary side controller may control the primary side switch, and the secondary side controller may control the secondary side switch, i.e. controlling the diode conduction time and the generation of ZVS pulse, as described above in relation to FIGS. 1 and 2.

Figure 3B:
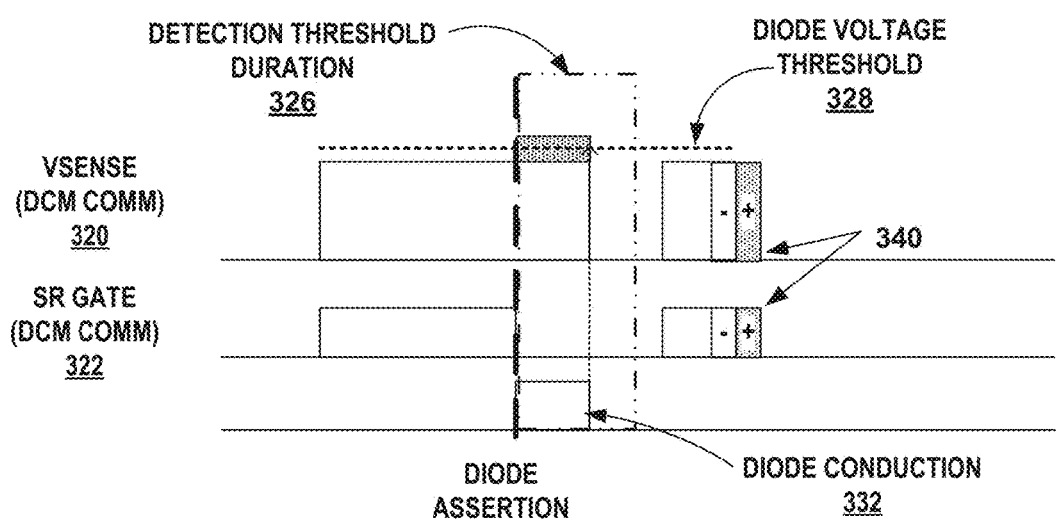
FIG. 3B. is a timing diagram illustrating DCM communication by modulating the period of the switching cycle according to one or more techniques of this disclosure.

FIG. 3B is a timing diagram illustrating DCM communication by modulating the period of the switching cycle according to one or more techniques of this disclosure. The ZVS pulses 340 with the increase, reduced or no change to the period correspond to the period modulation window 313 of FIG. 3A. FIG. 3B also depicts aspects of diode conduction time modulation, which may correspond to the diode conduction modulation window 311 of FIG. 3A. Vsense 320 corresponds to the reflected voltage of the secondary winding to the primary winding, e.g., Vsense 126 described above in relation to FIG. 2. During diode conduction 332, Vsense may increase above the diode voltage threshold 328. Primary controller may detect the diode conduction time 322 when Vsense 320 exceeds diode threshold voltage 328. The primary controller may decode when the diode conduction time 332 exceeds the diode threshold duration 326, as a digital symbol.

Figure 4A:
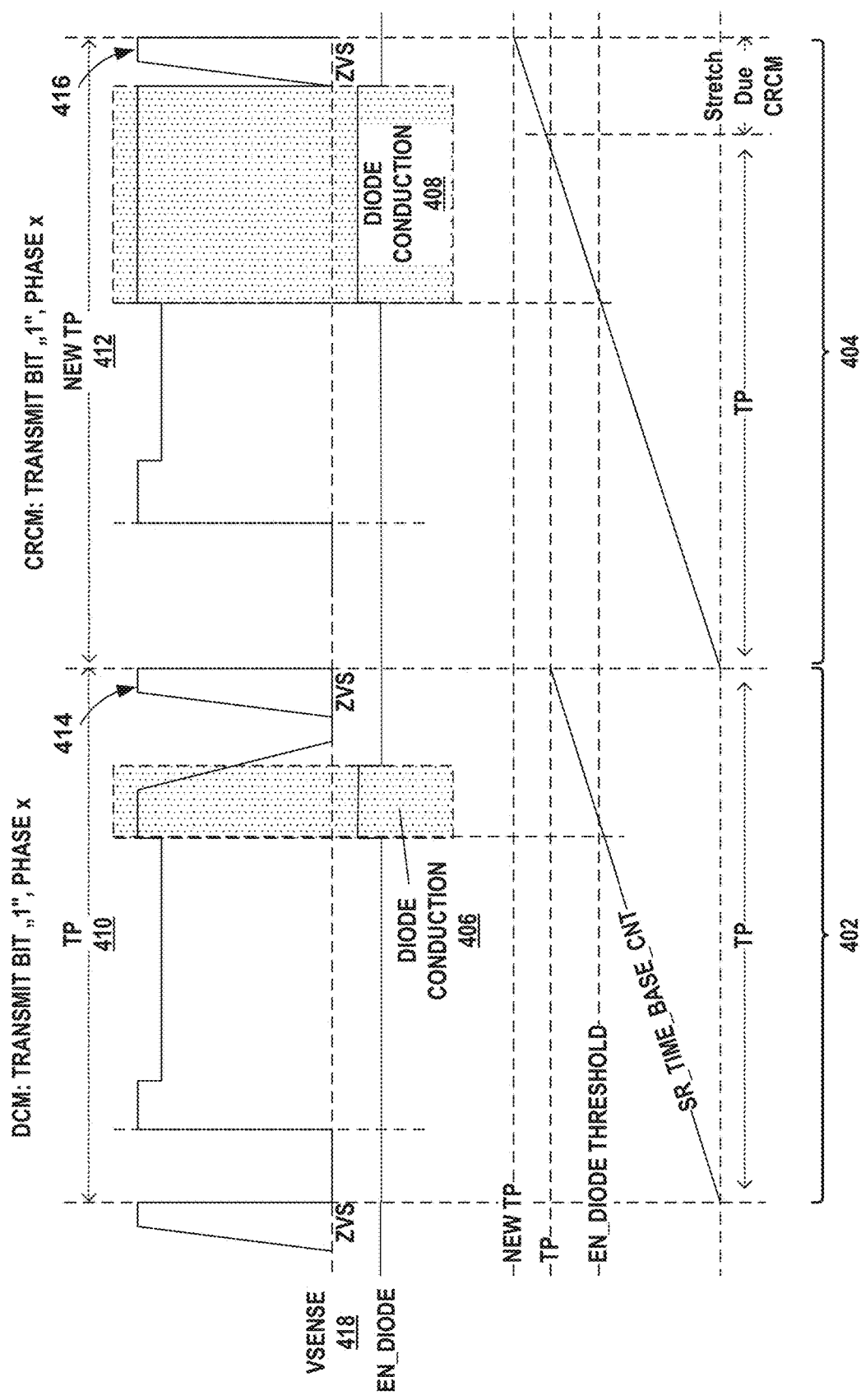
FIG. 4A is a timing diagram illustrating modulating the diode conduction time to transmit a digital ONE while in CRCM according to one or more techniques of this disclosure.

FIG. 4A is a timing diagram illustrating modulating the diode conduction time to transmit a digital ONE while in CRCM according to one or more techniques of this disclosure. FIG. 4A is just one example technique to encode a digital symbol by extending the diode conduction time. In other examples, a secondary controller and primary controller may be configured to encode and decode a digital ZERO based on extending the diode conduction time.

The secondary controller, e.g., secondary controller 104 described above in relation to FIG. 2, may modulate the diode conduction width to transmit a bit "1", to provide the primary side controller a means to decode the bit sent via the flyback power transformer when a CRCM cycle occurs during the digital message transmission. The example of FIG. 4A shows a DCM cycle 402 followed by a CRCM cycle 404. For DCM cycle 402, the secondary side controller may trigger ZVS pulse 414 after the voltage decays to approximately zero, which can be detected by the primary controller on Vsense 418. ZVS pulse 414 completes the switching period, TP 410. TP 410 may also be referred to as the timing period or switching cycle in this disclosure. Diode conduction time 406 may be controlled by the secondary controller turning off the SR switch, which causes $V_{DS}$ of the SR switch to rise, and can be sensed by the primary controller on Vsense 418.

To encode a digital ONE during the CRCM cycle 404, the secondary controller may turn off the SR switch causing a diode conduction time 408 that exceeds a diode conduction time threshold. The primary side controller may decode the extended diode conduction time as a digital ONE, in the example of FIG. 4A. The secondary controller may use diode modulation to take into account the occurrence of the CRCM switching cycle during the bit transmission, and for all the remaining switching cycles used to transmit that bit. In some examples, each bit may be transmitted by 2 or more cycles, e.g., using 3 or 4 switching cycles.

Figure 4B:
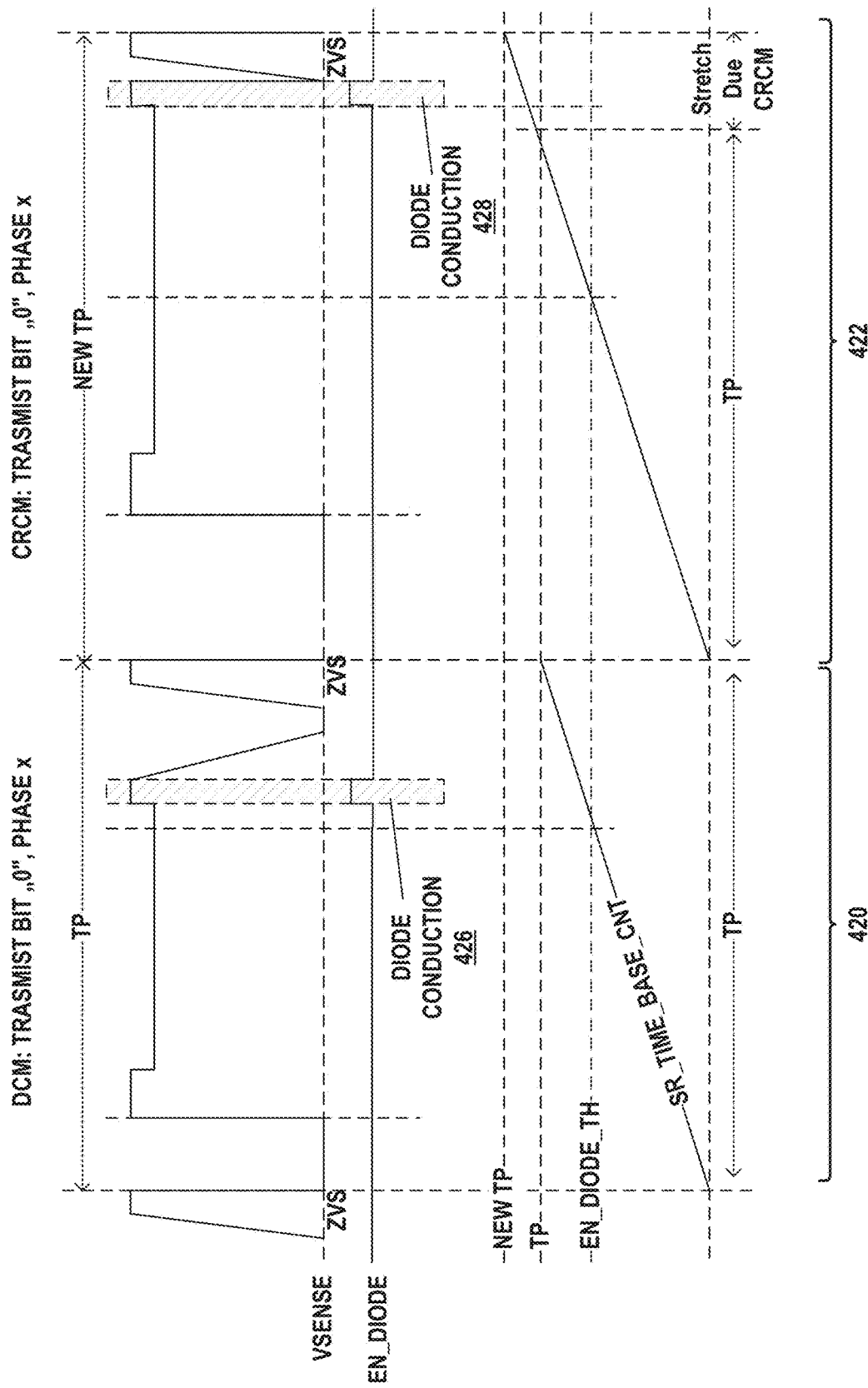
FIG. 4B is a timing diagram illustrating modulating the diode conduction time to transmit a digital ZERO while in CRCM according to one or more techniques of this disclosure.

FIG. 4B is a timing diagram illustrating modulating the diode conduction time to transmit a digital ZERO while in CRCM according to one or more techniques of this disclosure. Similar to FIG. 4A, the example of FIG. 4B shows a DCM cycle 420 followed by a CRCM cycle 422. However, to encode a digital ZERO, the primary side controller may set diode conduction times 426 and 428 to less than the threshold duration, for example, by keeping the gate to the SR switch enabled, thereby keeping the SR switch on and the $V_{DS}$ for the SR switch lower than when the body diode conducts the secondary current. The primary controller may detect the diode conduction time, determine that the time is less than the threshold duration and decode the diode conduction time as a digital ZERO.

Figure 5:
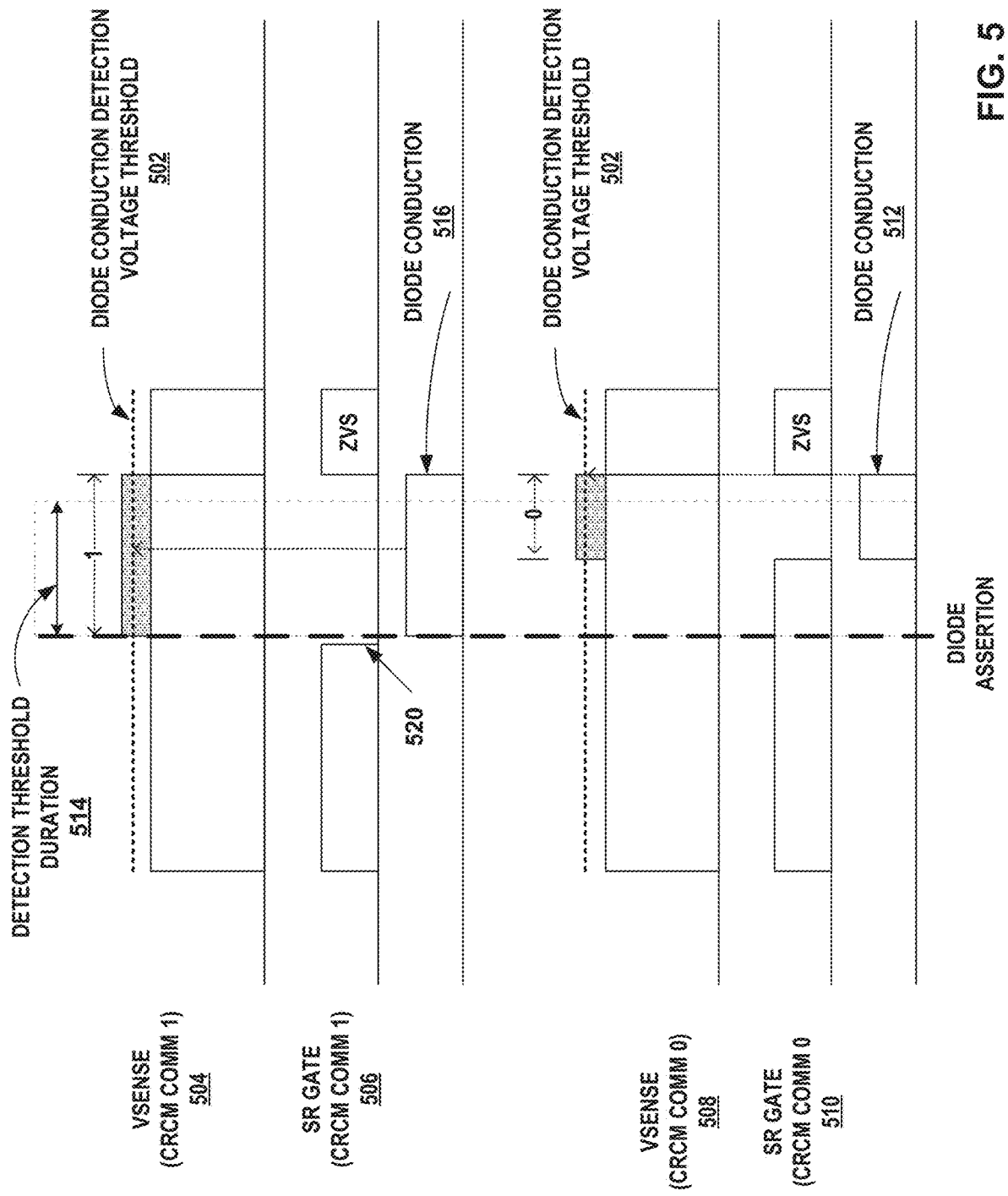
FIG. 5 is a timing diagram illustrating details for the SR switch gate signal to modulate the diode conduction time to encode digital information while in CRCM according to one or more techniques of this disclosure.

FIG. 5 is a timing diagram illustrating details for the SR switch gate signal to modulate the diode conduction time to encode digital information while in CRCM according to one or more techniques of this disclosure. As described above in relation to FIGS. 1, 2, 4A and 4B, to encode a digital symbol during CRCM, the secondary controller signals the gate of the SR switch to control the duration of the diode conduction time.

In the example of FIG. 5, to encode a digital ONE, the secondary controller releases, or turns off the SR switch early (520) and starts body diode conduction 516, as shown by the SR gate signal 506. With the secondary current through the body diode, $V_{DS}$ of the SR switch increases, which Vsense 504 may detect on the primary side as satisfying the diode conduction detection voltage threshold 502. When the duration of diode conduction 516 exceeds the detection threshold duration 514, then the primary controller may decode the diode conduction time 516 as a digital ONE. In other examples, as noted above in relation to FIG. 2, the primary controller may be configured to interpret exceeding the detection threshold duration 514 as a digital ZERO, or some other digital symbol. To encode a digital ZERO in the example of FIG. 5, the secondary controller may turn off the SR switch such that the diode conduction time 512 is less than the detection threshold duration 514 as shown by the SR gate control signal 510.

Figure 6A:
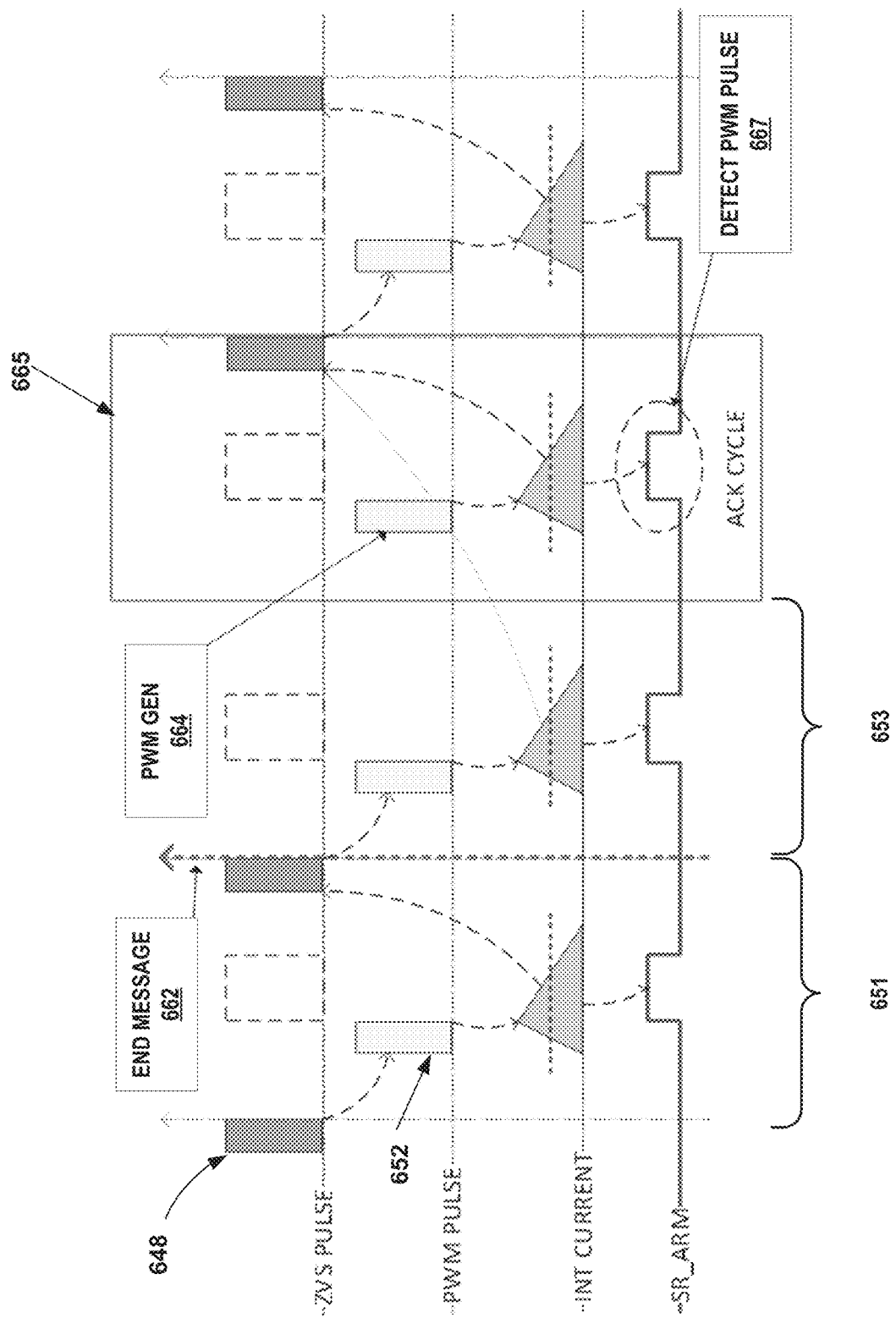
FIGS. 6A and 6B are timing diagrams illustrating the acknowledge (ACK) and not acknowledge (NACK) indications from the primary side to the secondary side.
Figure 6B:
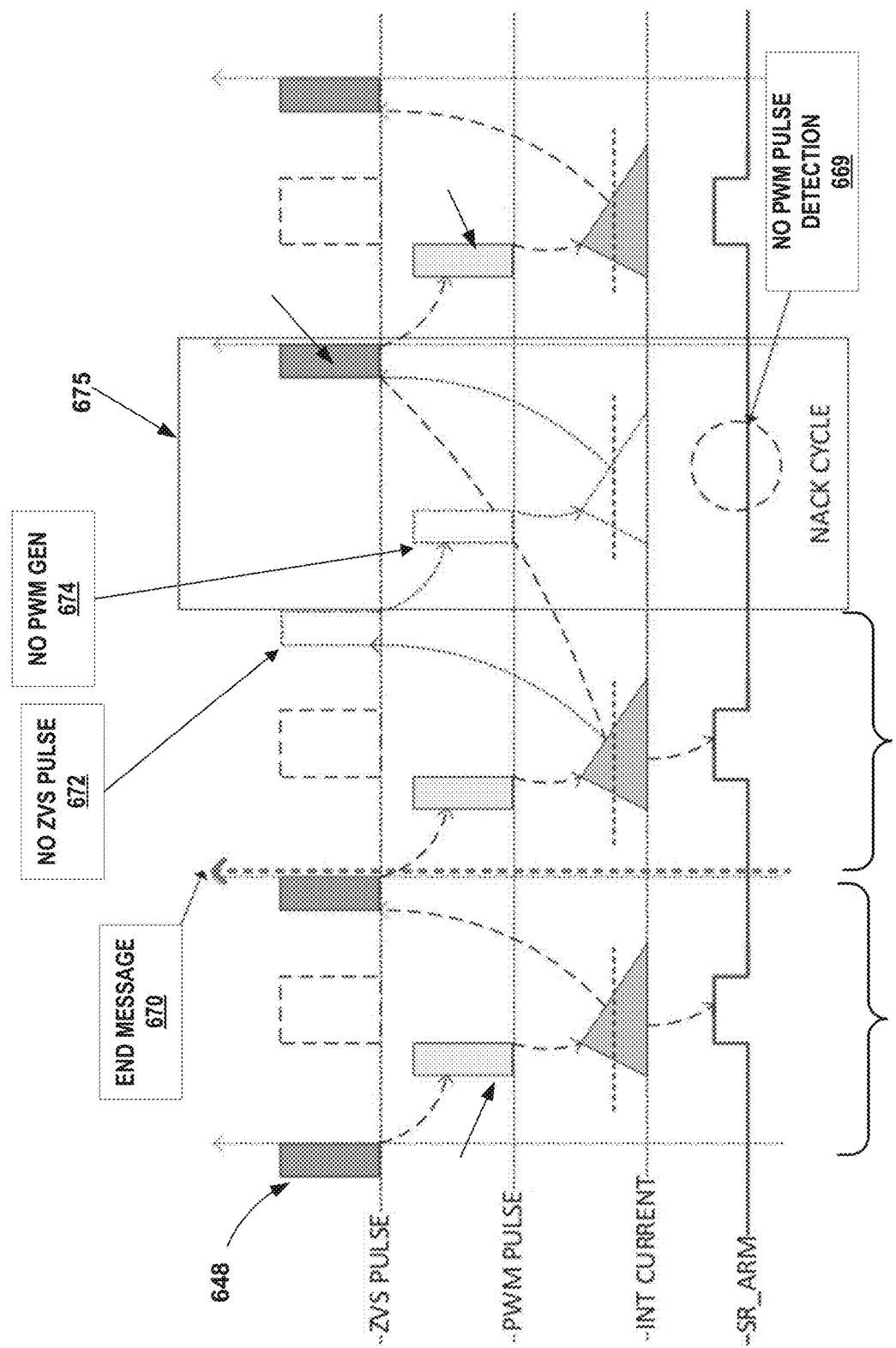

FIGS. 6A and 6B are timing diagrams illustrating the acknowledge (ACK) and not acknowledge (NACK) indications from the primary side to the secondary side. As described above in relation to FIGS. 1 and 2, the acknowledge/non-acknowledge technique of this disclosure assumes the SR controller will always force a skip switching cycle after the end of the message transmission (662), e.g., the SR controller will not generate a ZVS pulse, as shown at the end of cycle 653. Cycle 653 is the next subsequent switching period after sending the final bit of the digital information 662 and has no ZVS pulse.

Also, at the end of a message transmission 662, the primary side controller will force a PWM pulse 664 to acknowledge the message during the ACK cycle 665, even when a ZVS pulse is not generated. In other words, the primary side controller may break the rule that when in in ZVS mode the primary side controller should generate a PWM pulse to turn on the primary side switch only in response to detecting the ZVS pulse, e.g., 652 as shown in cycle 651. Therefore, the acknowledge event will be detected by the secondary side controller by detecting a PWM pulse 667 generated by primary side controller subsequent to the skipped switching cycle 653 after the end of message transmission 662.

FIG. 6B illustrates the NACK indication from the primary side controller. The non-acknowledge event 669 will be detected by the secondary side controller by not detecting a PWM pulse 674 after the skipped switching cycle 657 subsequent to the end of transmission 670. In other words, in response to determining that primary side controller received the final bit of the digital information 670, and determining that the digital information is not valid, the primary side controller is configured to withhold the control signal during the next subsequent switching period 675 after receiving an indication of the final bit of the digital information, e.g., as indicated by no ZVS pulse 672. As described above in relation to FIG. 2, the secondary side controller may detect the PWM control signal to the gate of the primary side switch because the primary side switch turns on and current flows through the primary side coil. The change in voltage on the primary side is reflected across the transformer and detectable by the secondary side controller.

Figure 7:
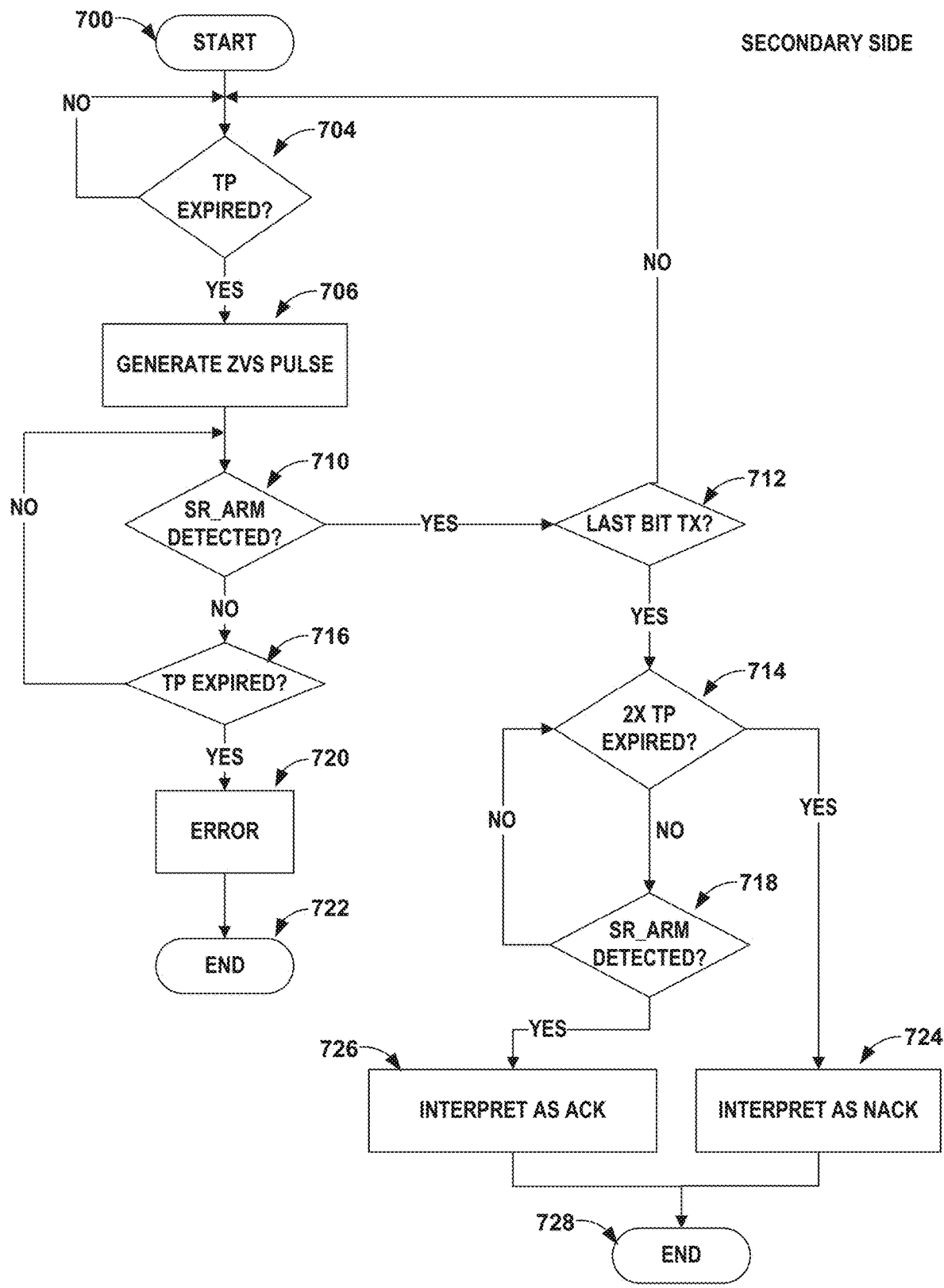
FIG. 7 is a flow chart illustrating an example operation of the secondary side controller to interpret an acknowledgement of digital communication according to one or more techniques of this disclosure.

FIG. 7 is a flow chart illustrating an example operation of the secondary side controller to interpret an acknowledgement of digital communication according to one or more techniques of this disclosure. FIG. 7 describes details of the timing diagrams described above in relation to FIGS. 6A and 6B and secondary controller 104 described above in relation to FIG. 2.

After the start (700), the secondary controller may monitor the status of a timer or counter to when the timing period, e.g. the switching cycle, expires (704). The secondary controller may generate a ZVS pulse (706), when operating with ZVS switching, such that the falling edge of the ZVS pulse aligns with the end of the timing period. The secondary controller may monitor the integrated current from the secondary coil for the end of the primary side switching pulse, to detect an SR_ARM signal (710). When the secondary controller does not detect the SR_ARM signal and the timing period has not expired (716), the secondary controller may continue to monitor the integrated current.

In some examples, if the switching cycle has ended (716) and the secondary controller has not detected a PWM pulse, the secondary controller may determine there is an error (720). In some examples the secondary controller may output an error signal to a master device or some other processing circuitry (not shown in FIG. 7), and end (722).

Also, during digital communication, the secondary controller may also verify whether the last bit of a digital message has been transmitted (712). If not, the secondary controller may continue to monitor the timing period counter for the end of the switching cycle (704). When the secondary controller has transmitted the last bit of a digital message (712), the secondary controller may withhold the ZVS pulse and monitor the integrated current for a PWM pulse from the primary side controller, e.g. detect an SR_ARM signal (718). If the secondary controller detects the SR_ARM signal (718) within two switching cycles (714) then the secondary controller may interpret the detected PWM signal as an ACK (726) and end (728) the digital communication process. In other examples, when the secondary controller does not detect the PWM signal from the primary side within the time limit, e.g., before a 2× TP counter expires (714), the secondary controller may interpret the skipped PWM pulse as a NACK (724) and end (728).

Figure 8:
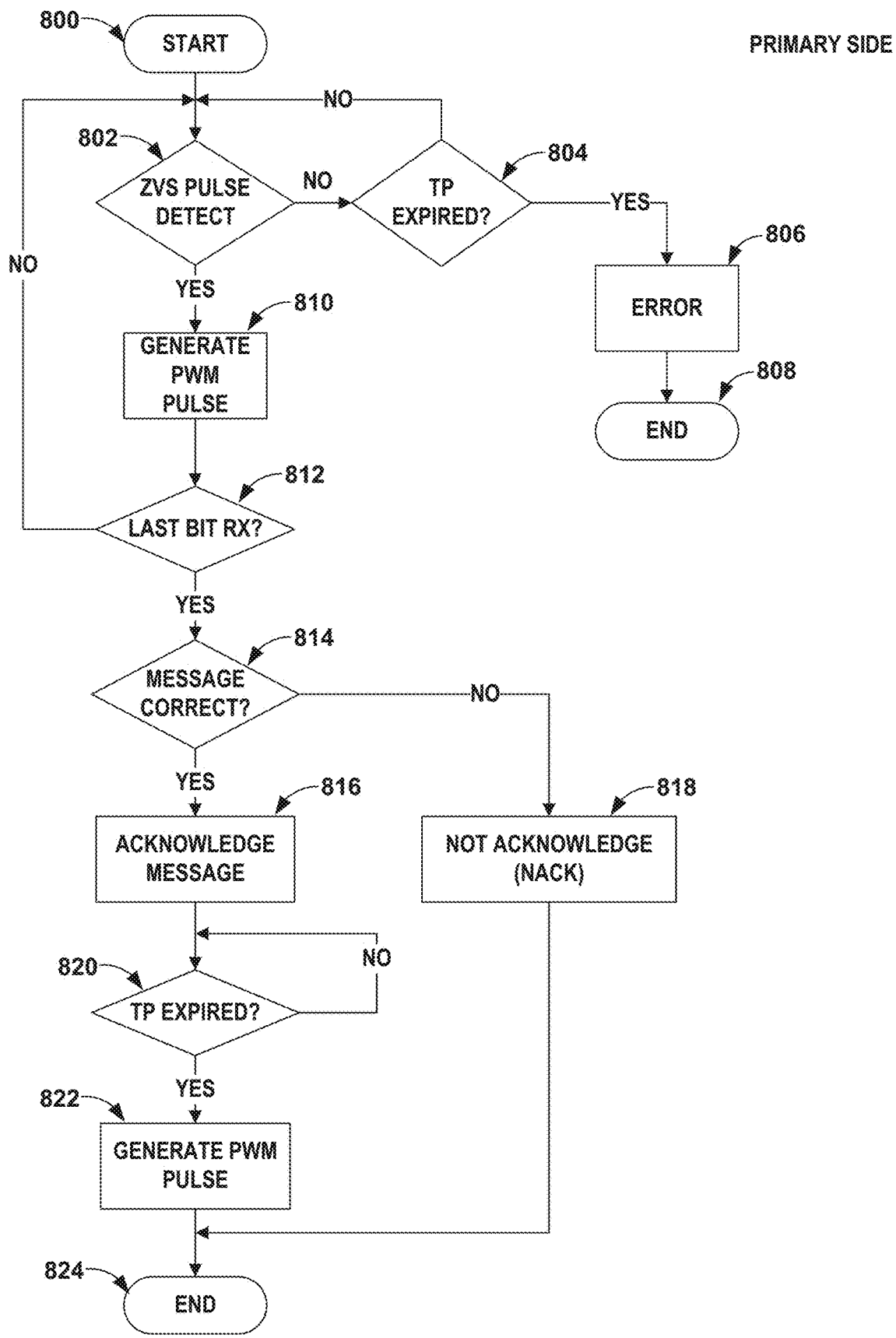
FIG. 8 is a flowchart illustrating an example operation of the primary side controller to acknowledge receipt of digital communication according to one or more techniques of this disclosure.

FIG. 8 is a flowchart illustrating an example operation of the primary side controller to acknowledge receipt of digital communication according to one or more techniques of this disclosure. As with FIG. 7, the blocks of FIG. 8 describe additional details of the timing diagrams described above in relation to FIGS. 6A and 6B and operation of primary controller 102 described above in relation to FIG. 2.

The primary controller may monitor Vsense, e.g. via switching detector 128 described above in relation to FIG. 2, to detect a ZVS pulse (802) on the secondary side of the transformer. If the timing period counter expires (804) and the primary controller fails to detect the ZVS pulse, the primary controller may flag an error (806) and end (808) or enter an error recovery mode of operation. In other examples, the primary controller may detect the ZVS pulse (802) and generate a PWM pulse (810) to turn on the primary side switch.

During digital communication, the primary controller may receive an indication that the primary controller received the last bit of the digital communication (812), e.g. by detecting a skipped ZVS pulse, or receiving an end of message (EOM) indication such as a validation code, e.g. a CRC as described above in relation to FIG. 1. In some examples, the primary controller may determine that the message is correct (814) and prepare to acknowledge the message (816). When the timing period has expired (820) without receiving a ZVS pulse, the primary controller may generate a PWM pulse (822) that turns on the primary switch to send an ACK to the secondary side and end the communication process (824).

In other examples, the primary controller may not receive the entire message, or otherwise determine that the message is not correct (814), e.g. the validation code may not match the sent message. The primary controller may withhold the PWM pulse in the absence of the ZVS pulse, which is normal procedure, except at the end of digital communication. Withholding the PWM pulse may output an indication of a NACK (818) to the secondary controller.

Figure 9:
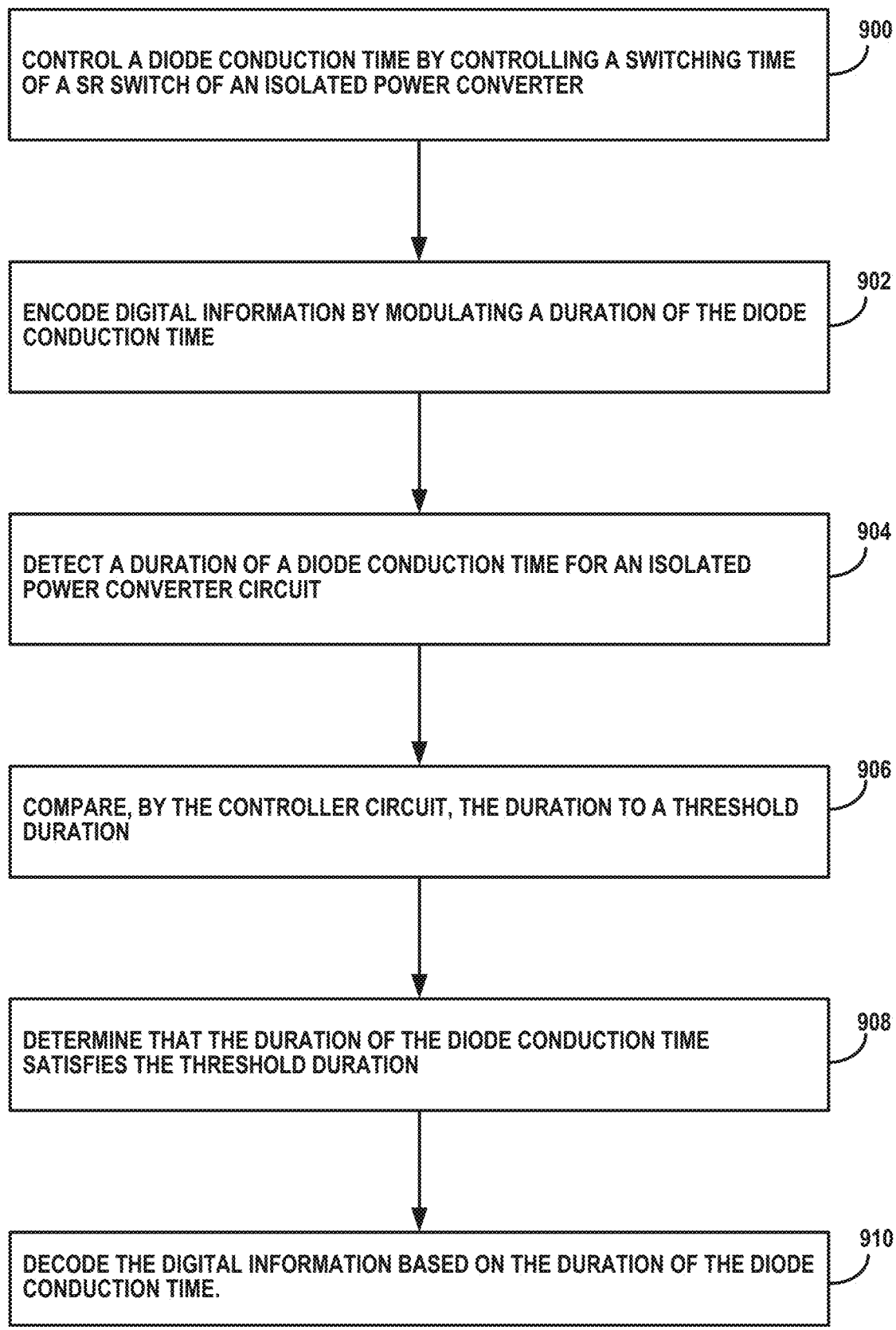
FIG. 9 is flowchart illustrating an example operation of digital communication by modulating the diode conduction time according to one or more techniques of this disclosure.

FIG. 9 is flowchart illustrating an example operation of digital communication by modulating the diode conduction time according to one or more techniques of this disclosure. The blocks of FIG. 9 correspond to the timing diagrams described above in relation to FIGS. 4A and 4B.

A secondary side controller, e.g., secondary controller 104, depicted in FIG. 2, may control a diode conduction time by controlling a switching time of SR switch M2 112 of an isolated power converter (900). The secondary side controller may encode digital information by modulating a duration of the diode conduction time (902), e.g. such that the diode conduction time exceeds a threshold duration or is set to less than the threshold duration.

The primary controller may detect a duration of the body diode conduction time of the SR switch based on an increase in $V_{DS}$ across the SR switch when the secondary controller turns off the SR switch (904). The secondary controller may change to modulating the diode conduction time from modulating the switching period when the isolated power converter enters CRCM.

The primary controller may compare the duration of the diode conduction time to a threshold duration (906). The primary controller may determine that the duration of the diode conduction time satisfies the threshold duration (908). In some examples, to satisfy the threshold duration means that the diode conduction time exceeds the threshold duration. In some examples, the primary controller may decode satisfying the threshold duration by exceeding the threshold duration as a digital ONE (910).

In other examples, the diode conduction time may satisfy the threshold duration by being less than the threshold duration. In some examples, the primary controller may decode a diode conduction time that is less than the threshold duration as a digital ZERO (910).

Figure 10:
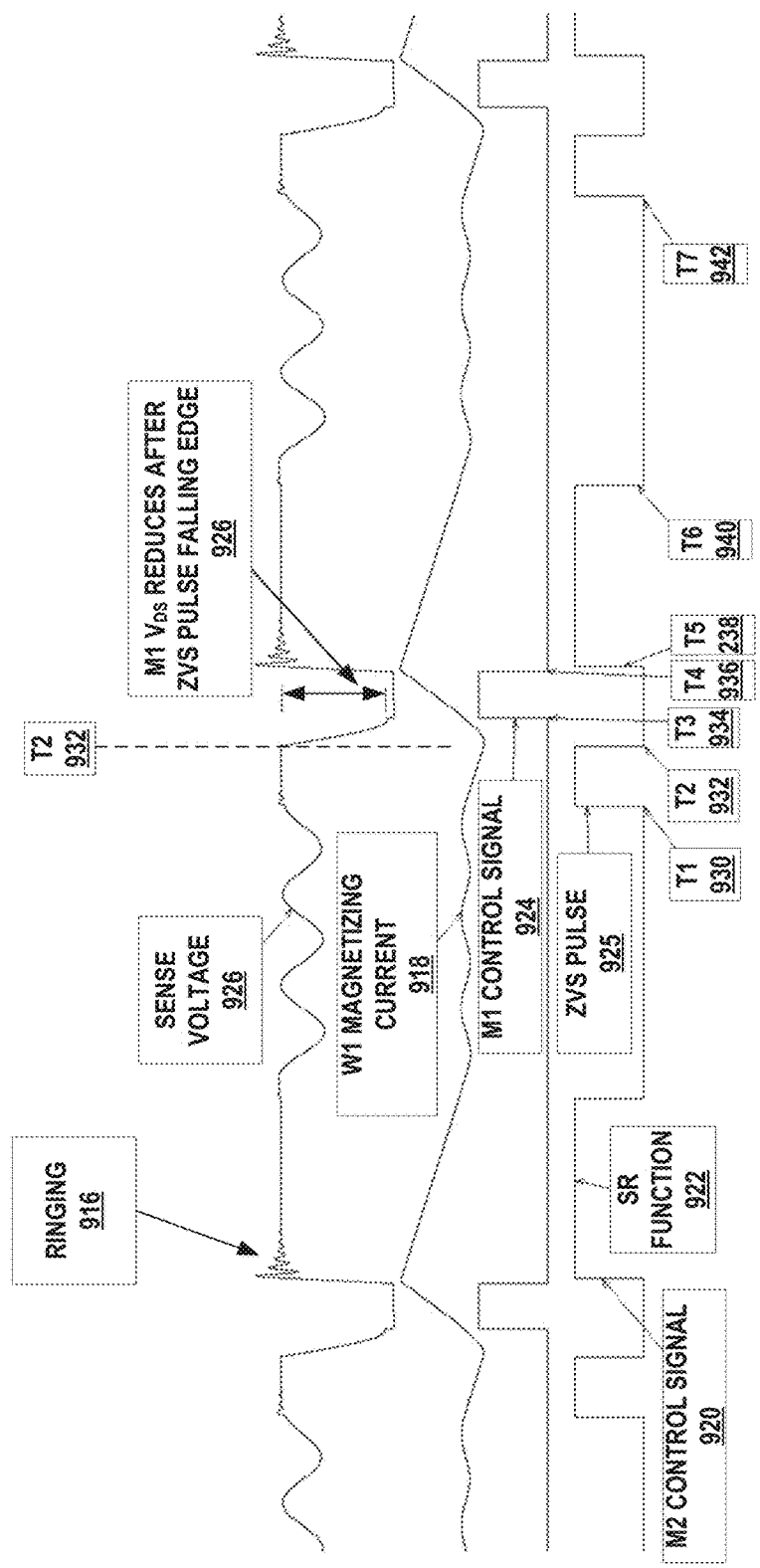
FIG. 10 is a timing diagram illustrating an example operation of a power converter circuit that includes a ZVS pulse detection circuit, according to one or more techniques of this disclosure.

FIG. 10 is a timing diagram illustrating an example operation of a power converter circuit that includes a ZVS pulse detection circuit, according to one or more techniques of this disclosure. The example of FIG. 10 depicts an example of a switching cycle of a flyback power converter, similar to power converter 100 described above in relation to FIG. 2. The description of the timing diagram of FIG. 10 may refer to components in The timing diagram of FIG. 10 depicts sense voltage 926 as the topmost curve, the power transformer (W1) magnetizing current, 918, primary switch (M1) control signal 924 and secondary switch (M2) control signal 920. Sense voltage curve 926 corresponds to the magnitude of voltage over time of $V_{REFLECTED}$ 130 as measured at $V_{SENSE}$ terminal 126, depicted in FIG. 2. W1 magnetizing current 918 corresponds to the magnitude of current over time of IMAG 124, as well as a corresponding magnetizing current on the secondary winding of transformer W1 114. M1 control signal 924 corresponds to the output of primary controller 102 connected to the gate of primary transistor M1, 110. M2 control signal 920 corresponds to the output of secondary controller 104 connected to the gate of SR switch M2, 112.

The power converter switching cycle starts as the time T1 930. At time T1 930 SR switch M2 112 is turned on to generate ZVS pulse 925. W1 magnetizing current starts to build up in the negative direction. Using the Vsense voltage waveform 926, primary side 131, by using pulse detector 128 and primary controller 102, may can detect the ZVS pulse 925 event.

At the time T2 (932), SR switch M2 112 is turned off when M2 control signal 920 goes from high to low at the end of the ZVS pulse 925 event. After SR switch M2 112 turns off, the negative transformer magnetizing current (primary side) 918 recharges the Vds capacitance of primary side switch M1 110 (926).

At the time T3 (934), the drain-source voltage, Vds, of primary side switch M1 110 is minimal, because M1 control signal 924 goes from low to high and primary side switch M1 110 is turned ON. As primary side switch M1 110 turns on, W1 magnetizing current 918 starts to increase in a positive direction.

At the time T4 (936), transformer magnetizing current reached a desired setpoint level, M1 control signal 924 goes from high to low and primary side switch M1 110 is turned OFF. Transformer magnetizing current (secondary side) 918 is redirected to the body diode of SR switch 112, and starts to charge the output capacitor, e.g. capacitor C2 120. In some examples, reaching the desired setpoint level may be controlled by a peak current control or by a time-based PWM control, or some other type of output control technique.

At the time T5 (938), SR switch M2 112 is switched ON to reduce the rectifier voltage drop and to improve the efficiency, as described above in relation to FIG. 2. This is also depicted as SR function 922 for a previous switching cycle to the switching cycle described by T1-T6. Also, during T5, sense voltage 926 shows the ringing 916 caused by switching OFF M1 at T4 and turning ON SR switch 112, as described above in relation to FIG. 2. At time T6 (940), SR switch M2 112 is switched OFF. Switching cycle is completed and primary side controller 102 waits for next ZVS pulse event. At the time T7 (942), the end of the time period, the next switching cycle is started with a ZVS pulse, as described above in relation to FIGS. 4A, 4B, 7 and 8.

In the example of FIG. 10, a low to high transition on the transistor control signal, e.g. 924 or 920, turns ON a transistor. In other examples, such as in the case of a negative voltage power supply, the signals of FIG. 10, i.e., negative vs. positive and high vs. low transitions may configured in a different manner.

Figure 11:
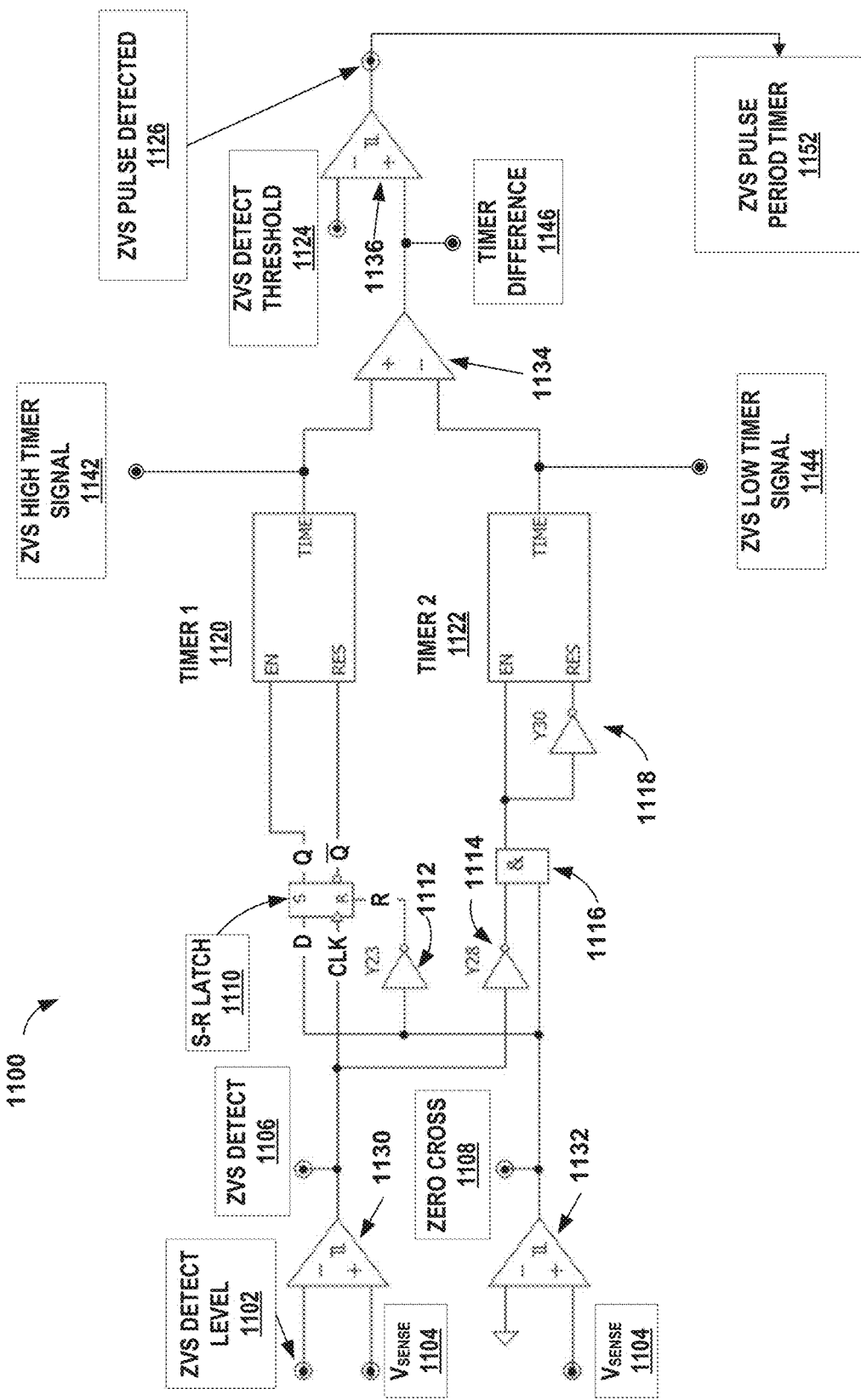
FIG. 11 is a schematic diagram illustrating one example implementation of ZVS detection and zero voltage crossing detection, according to one or more techniques of this disclosure.

FIG. 11 is a schematic diagram illustrating one example implementation of ZVS detection and zero voltage crossing detection, according to one or more techniques of this disclosure. Pulse detector 1100 is one example implementation of pulse detector 128 depicted in FIG. 2. In some examples, pulse detector 1100 may be incorporated into a primary side controller, such as primary controller 102 depicted in FIG. 2.

Example pulse detector 1100 uses two comparators 1130 and 1132 for the operation. Comparator 1132 is part of a zero cross detection circuit and comparator 1130 detects the ZVS event as described above in relation to FIG. 5.

The zero cross detection circuit may include comparator 1132, timer 2 1122, and one or more logic gates, such as inverter 1114, AND gate 1116, and inverter 1118. The inverting input of comparator 1132 connects to a zero reference voltage, e.g. circuit ground, and the non-inverting input of comparator 1132 connects to Vsense 1104. Vsense 1104 corresponds to $V_{REFLECTED}$ 130 as measured at the Vsense 126 input of pulse detector 128, as depicted in FIG. 2. The output of comparator 1132 is the zero cross signal 1108, which connects to AND gate 1116. Zero cross signal 1108 connects to the Set input of SR latch 1110 directly as well as the Reset input of SR latch 1110 through NOT gate Y23 (1112). The output of AND gate 1116 connects to the Enable input of timer 2 1122 as well as to the Reset input of timer 2 1122 through NOT gate Y30 (1118). The output of timer 2 1122 is the ZVS low timer signal 1144, which connects to the inverting input of an op amp configured as a subtraction circuit 1134.

The ZVS detection circuit may include comparator 1130, S-R latch 1110, inverter 1112 and timer 1 1120. In the example of FIG. 11, comparator 1130 has a non-inverting input connected to the same Vsense 1104 input as the non-inverting input to comparator 1132. The inverting input to comparator 1130 connects to a voltage threshold for ZVS detection level 1102. The output of comparator 1130 is the ZVS detection signal 1106. ZVS detection signal 1106 indicates when the reflected voltage signal, e.g. VREFLECTED 130 depicted in FIG. 2, is less than a predetermined threshold voltage, i.e. ZVS detection level 1102, where ZVS detection level 1102 threshold is greater than zero volts.

The output of comparator 1130 connects to the clock input of clocked SR latch 1110 as well to AND gate 1116 through NOT gate Y28 (1114). The non-inverted output Q of SR latch 1110 connects to the Enable input of timer 1 1120. The inverted output not-Q ($\overline{Q}$) as connects to the Reset input of timer 1 1120. The output of timer 1 1120 is the ZVS high timer signal 1142, which connects to the non-inverting input of the op amp configured as a subtraction circuit 1134.

The output of subtraction circuit 1134 is timer difference signal 1146. Timer difference signal 1146 is ZVS low timer signal 1144 (from the zero cross detection circuit) subtracted from ZVS high timer signal 1142 (from the ZVS event detection circuit). Timer difference signal 1146 connects to the non-inverting input of comparator 1136 and is compared to a ZVS detection threshold 1124 connected to the inverting input of comparator 1136. ZVS detect threshold 1124 should not be confused with ZVS detection level 1102, though both voltage thresholds have a similar name in this disclosure. ZVS detect threshold 1124 may also be considered a ZVS event detection threshold. The output of comparator 1136 is the ZVS detected signal 1126 to ZVS pulse period timer 1152.

In operation, example pulse detector 1100 may use the two comparators 1130 and 1132 for the SR switching detection operation. One of the comparators, comparator 1132, detects the Vsense zero crossing, and the other comparator 1130 detects when the Vsense level is above a threshold (ZVS detect level 1102), which is set to be slightly below the desired reflected output voltage. The desired reflected output voltage is the voltage setpoint for the power to be output to the load, such as load 4 depicted in FIG. 1.

ZVS detect level 1102 threshold at the inverting input of comparator 1130 is a voltage very close to the desired reflected output voltage. Because of small variations in the output voltage, the sensed voltage (Vsense 1104) may cross the threshold ZVS detect level 1102 many times during a switching cycle. This may mean that the ZVS detect signal 1106 may be difficult to analyze. However, the signal from the zero cross comparator 1132, i.e. zero cross signal 1108, may be stable in comparison to ZVS detect signal 1106 and therefore zero cross signal 1108 may be used to qualify ZVS detector comparator signal.

Pulse detector 1100 may use the two timers, i.e. timer 1 1120 and timer 2 1122, for the signal qualification of ZVS detect signal 1106. timer 1 1120 starts counting on the first rising edge of the ZVS detector comparator signal, ZVS detect signal 1106, and timer 1 1120 will continue to count until the falling edge of the output of zero cross comparator 1132, i.e. zero cross signal 1108. In other words, timer 1 1120 is configured to output an amount of time between each instance when the reflected voltage signal momentarily exceeds the predetermined threshold voltage, ZVS detect level 1102, and when the reflected voltage signal becomes less than approximately zero volts.

Timer 2 1122 begins counting when zero cross signal 1108 is high but ZVS detector comparator signal 1106 is low. The difference between the two counters, i.e. the output of subtraction circuit 1134 (timer difference signal 1146) represents the amount of time the voltage across the SR switch was close to zero, e.g. SR switch M2 112 depicted in FIG. 2. In other words, timer 2 1122 is configured to output an amount of time when both: (a) the output from the zero cross circuit indicates that the reflected voltage signal, Vsense 1104, is greater than approximately zero volts; and the output from the ZVS detection circuit, ZVS detect 1106, indicates that the reflected voltage signal, Vsense 1104, exceeds the predetermined threshold voltage, ZVS detect level 1102.

Subtraction circuit 1134 may be configured to subtract the output of timer 2 1122 from the output of timer 1 1120 and output a subtraction result. By comparing timer difference signal 1146 with ZVS detect threshold 1124 results in pulse detection circuit 1100 reliably detecting the ZVS pulse (i.e. ZVS event) from SR switch on the secondary side. In other words, the primary side controller, such as primary controller 102 depicted in FIG. 2, is configured to detect the switching time of the SR switch, i.e. SR switch M2 112, based on a reflected voltage as sensed on a primary winding (VSENSE 126) of the power transformer. Pulse detector circuit, 1100, which may be coupled to primary controller 102 is configured to compare the subtraction result, timer difference 1146, to a predetermined subtraction threshold ZVS detect threshold 1124. Based on timer difference 1146 satisfying ZVS detect threshold 1124, pulse detection circuit 1100 will indicate a detection of the switching time of secondary side SR switch in the output of ZVS detected signal 1126.

Figure 12:
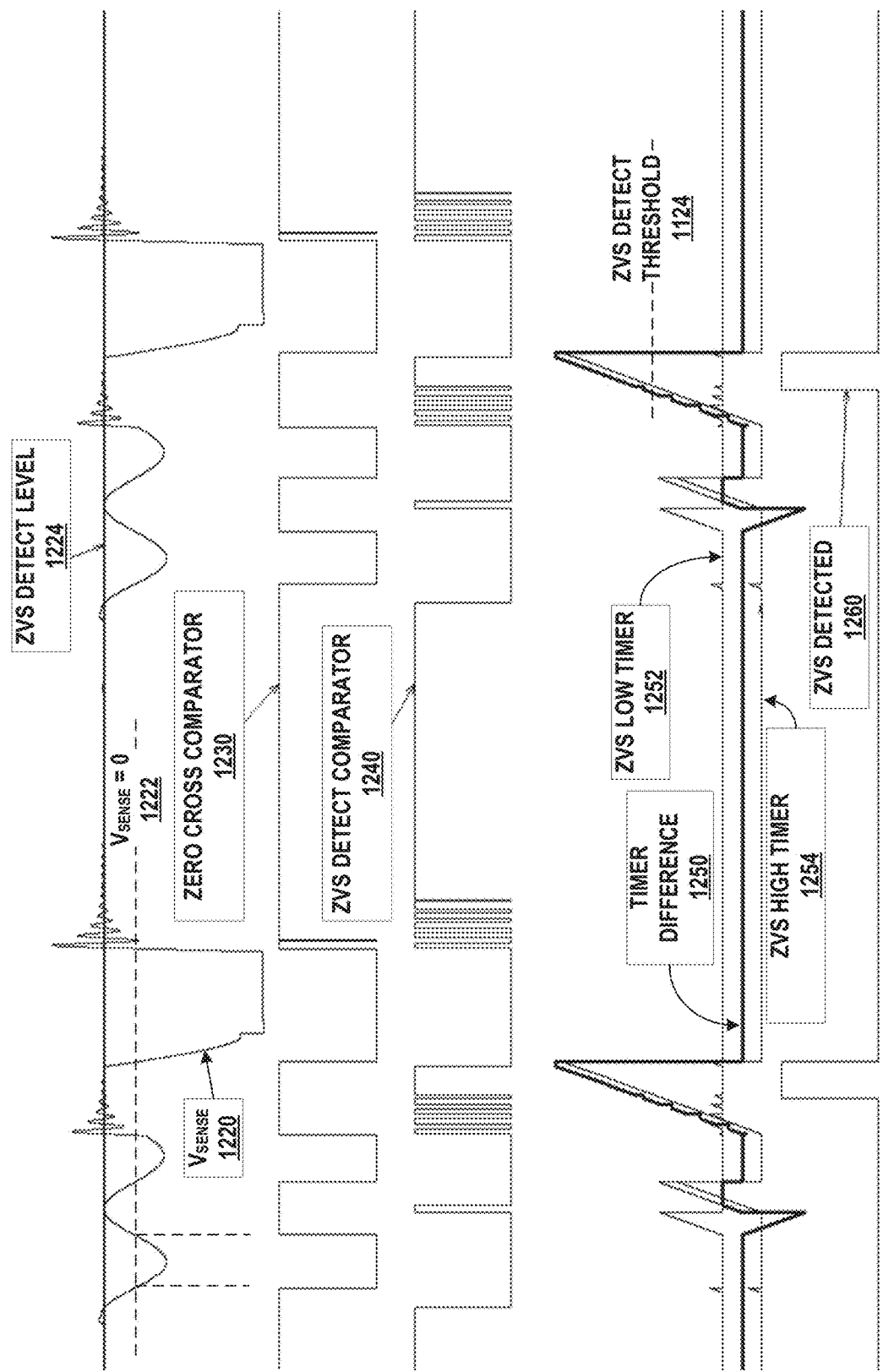
FIG. 12 is a timing diagram illustrating an example implementation of ZVS pulse detection by the example configuration of the pulse detector of FIG. 10.

FIG. 12 is a timing diagram illustrating an example implementation of ZVS pulse detection by the example configuration of the pulse detector of FIG. 11. The description of the signals in FIG. 12 will refer to components of pulse detector 1100 depicted in FIG. 11.

As shown by the timing diagram of FIG. 12, a pulse detector circuit of this disclosure, such as pulse detector 1100, may compare the timing of the $V_{SENSE}$ 1220 waveform, the zero cross comparator 1230 waveform, the ZVS detect comparator 1240 waveform, the ZVS low timer 1252 waveform, the ZVS high timer 1254 waveform, the timer difference 1250 waveform and the ZVS detected 1260 waveform. The period of the switching cycle for a power converter, such as power converter described above in relation to FIG. 2, is the time between the falling edges of the ZVS detected signal 1260. Because the falling edge of ZVS detected signal 1260 is synchronized with the stable zero cross comparator 1230 signal, ZVS detected signal 1260 is also stable and may be used for high resolution detection of the SR switch timing.

$V_{SENSE}$ 1220 waveform may correspond to sense voltage 400 waveform of FIG. 12, $V_{SENSE}$ 1104 depicted in FIG. 11 and to $V_{SENSE}$ 126 depicted in FIG. 2. ZVS detect level 1224 may be set just below the desired reflected output voltage. As described above in relation to FIG. 2, the reflected output voltage is the output voltage, e.g. $V_{OUT}$ 122, as measured on the primary side of the power transformer, e.g. transformer W1 114 depicted in FIG. 2. ZVS detect level 1224 waveform corresponds to ZVS detect level 1102 input to comparator 330, depicted in FIG. 11. When $V_{SENSE}$ 1220 goes below ZVS detect level 1224, then ZVS detect comparator 1240, i.e. the output of comparator 330. goes from high to low. As described above, the signals of FIG. 11 are just one example based on the example configuration of pulse detector 1100. In other examples, comparator 330, or other components, may be configured to switch from low to high, rather than high to low.

The $V_{SENSE}=0$ level 1222 indicates where $V_{SENSE}$ 1220 waveform crosses zero. When $V_{SENSE}$ 1220 is greater than zero, zero cross comparator 1230 waveform is high. When $V_{SENSE}$ 1220 is less than zero, zero cross comparator 1230 waveform is low.

As described above in relation to FIG. 11, ZVS high timer 1254 waveform begins increasing as timer 1, 320, begins counting, which is when zero cross comparator 1230 waveform is HIGH but ZVS detector comparator 1240 waveform is LOW. ZVS low timer 1252 waveform begins increasing when timer 2, 1122 begins counting, which is when zero cross comparator 1230 waveform is high but ZVS detector comparator 1240 waveform is low Timer difference 1250 waveform is the output of subtraction circuit 1134, which is configured to subtract ZVS low timer 1252 waveform from ZVS high timer 1254 waveform. When the value of timer difference 1250 waveform satisfies the ZVS detect threshold 1124 (also depicted in FIG. 11), the pulse detector circuit 1100 indicates a ZVS pulse event detection, i.e. as generated by the SR switch.

In this manner, pulse detector circuit 1100 may determine the timing of the period of the switching cycle for the power converter as the time between the falling edges of the ZVS detected signal 1260. Communication is established from the secondary side of the power converter to the primary side by the modulating the period between the ZVS pulse time on the secondary side. The operation of pulse detector 1100, according to the waveforms depicted in FIG. 11, is one example technique for the primary side to detect the ZVS pulse and decode the communication. In some examples, decoding the communication may include a third timer circuit, ZVS pulse period timer 1152, to measure the length of each period and determine if a period is, for example a reduced period or an increased period.

While in DCM, the digital information may be encoded and decoded based on a variety of coding techniques. Some examples may include a differential coding scheme, or some other type of digital coding. In some examples, primary side controller circuit may include a timer, such as ZVS pulse period timer 1152 depicted in FIG. 11, to determine the length of each period, e.g. a reduced period or an increased period. The timer may be a circuit or may be a function executed by processing circuitry that may be included in the primary side controller. A timer function executed by processing circuitry may still be considered a timer circuit because the timer is implemented by circuitry.

In one or more examples, the functions described above may be implemented in hardware, software, firmware, or any combination thereof. For example, some components of FIG. 2, such as primary controller 102 and secondary controller 104 may be implemented in hardware, software, firmware, or any combination thereof. If implemented in software, the functions may be stored on or transmitted over, as one or more instructions or code, a computer-readable medium and executed by a hardware-based processing unit. In this disclosure, primary side controller 102 and secondary side controller 104 may also be referred to as controller circuitry.

By way of example, and not limitation, such computer-readable storage media may comprise RAM, ROM, EEPROM, magnetic disk storage, or other magnetic storage devices, flash memory, or any other medium that can be used to store desired program code in the form of instructions or data structures and that can be accessed by a computer. It should be understood, however, that computer-readable storage media and data storage media do not include connections, carrier waves, signals, or other transient media, but are instead directed to non-transient, tangible storage media. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

The techniques of this disclosure may also be described in the following examples.

Example 1: A method comprising controlling, by a secondary side controller, a diode conduction time by controlling a switching time of a synchronous rectification (SR) switch of an isolated power converter, wherein the isolated power converter comprises a power transformer; encoding, by the secondary side controller, digital information by modulating a duration of the diode conduction time; detecting, by a primary side controller of the isolated power converter, the duration of the diode conduction time; decoding, by the primary side controller, the digital information based on the duration of the diode conduction time.

Example 2: The method of example 1, wherein the secondary side controller encoding the digital information by modulating diode conduction time is in response to the isolated power converter entering critical conduction mode (CRCM).

Example 3: The method of example 2, further comprising extending, by the secondary side controller, the duration of the diode conduction time such that the diode conduction time is longer than a threshold duration to encode a digital ONE.

Example 4: The method of example 3, further comprising sending the digital ONE over two or more switching cycles.

Example 5: The method of example 3, further comprising setting, by the secondary side controller, the diode conduction time to less than the threshold duration to encode a digital ZERO.

Example 6: The method of example 1, further includes initiating, by the secondary side controller, zero voltage switching (ZVS) by controlling a switching time of the SR switch to cause a ZVS pulse; in response to sending a final bit of the digital information, withholding, by the secondary side controller, the ZVS pulse; in response to detecting the ZVS pulse, controlling, by the primary controller, a primary side switch with a control signal during a switching period; and in response to receiving the final bit of the digital information and decoding the digital information, controlling the primary side switch with the control signal without detecting the ZVS pulse.

Example 7: The method of example 6, further includes in response to detecting the control signal after withholding the ZVS pulse, determining, the secondary side controller, that the primary side controller of the power converter has decoded the digital information.

Example 8: The system of example 6, wherein the secondary side controller, in response to determining that: the secondary side controller has completed sending the digital information and withheld the ZVS pulse; and the secondary side controller has not detected the control signal, then determining, by the secondary side controller, that the primary side controller did not decode the digital information.

Example 9: The method of example 1, further includes initiating, by the secondary side controller, zero voltage switching (ZVS) by controlling a switching time of the SR switch; in response to the isolated power converter entering discontinuous conduction mode (DCM), encoding the digital information by modulating a period between the switching time of the SR switch; detecting, by the primary side controller, the switching time of the SR switch; and decoding, by the primary side controller, the digital information based on the modulated period between the switching time of the SR switch.

Example 10: The method of example 1, wherein the secondary side controller is electrically coupled to a gate of the SR switch; and wherein the primary side controller is configured to detect the switching time of the SR switch based on a reflected voltage sensed on a primary winding of the power transformer.

Example 11: A device comprising a primary side controller configured to: control a primary side switch of an isolated power converter; detect a duration of a diode conduction time for the isolated power converter; and decode the digital information based on the duration of the diode conduction time.

Example 12: The device of example 11, wherein: to decode a digital ONE, the primary side controller is configured to compare the duration to a threshold duration; and in response to determining that the duration exceeds a duration threshold, decode the duration as a digital ONE.

Example 13: The device of example 12, wherein in response to determining that the duration is less than the duration threshold, decode the duration as a digital ZERO.

Example 14: The device of example 11, wherein the primary side controller is further configured to: in response to detecting a ZVS pulse, control the primary side switch to send a control signal during a switching period; determine whether the digital information is valid; and in response to determining that the digital information is valid, and that primary side controller has received a final bit of the digital information, control the primary side switch to output the control signal without detecting the ZVS pulse.

Example 15: The device of example 14, wherein in response to determining that primary side controller received the final bit of the digital information, and determining that the digital information is not valid, the primary side controller is configured to withhold the control signal during the next subsequent switching period after receiving an indication of the final bit of the digital information.

Example 16: A device comprising a secondary side controller configured to control a synchronous rectification (SR) switch of an isolated power converter, wherein: the secondary side controller is configured to control a diode conduction time of the isolated power converter time by controlling a switching time of the SR switch; and encode digital information by modulating a duration of the diode conduction time.

Example 17: The device of example 16, wherein the secondary side controller is configured to control a diode conduction time in response to the isolated power converter entering critical conduction mode (CRCM).

Example 18: The device of example 17, wherein to encode a digital ONE, the secondary side controller is configured to extend duration of the diode conduction time such that the diode conduction time is longer than a threshold duration.

Example 19: The device of example 18, wherein the secondary side controller is configured to send the digital ONE over two or more switching cycles.

Example 20: The device of example 18, wherein to encode a digital ZERO, the secondary side controller is configured to set the diode conduction time to less than the threshold duration.

Example 21: In another example, this disclosure describes a method comprising detecting, by a controller circuit, a duration of a diode conduction time, wherein the diode conduction time is the diode conduction time for an isolated power converter circuit, comparing, by the controller circuit the duration to a threshold duration, determining, by the controller circuit, that the duration of the diode conduction time satisfies the threshold duration and decoding, by the controller circuit, digital information based on the duration of the diode conduction time.

Example 22: The method of example 21, wherein determining that the duration satisfies the threshold duration comprises determining that the duration exceeds the duration threshold, in response to determining that the duration exceeds the duration threshold, decode the duration as a digital ONE.

Example 23: The method of examples 21 and 22, further comprising, in response to determining that the duration is less than the duration threshold, decode the duration as a digital ZERO.

Example 24: The method of any combination of examples 21-23, further includes in response to determining that the isolated power converter circuit is in discontinuous conduction mode (DCM), detecting, by the controller circuit, a plurality of zero voltage switching (ZVS) pulses, wherein the plurality of ZVS pulses comprise a first ZVS pulse, a second ZVS pulse, a third ZVS pulse and a fourth ZVS pulse; determining, by the controller circuit, a first time period between the first ZVS pulse and the second ZVS pulse; determining, by the controller circuit, a second time period between the third ZVS pulse and the fourth ZVS pulse; and decoding, by the controller circuit, digital information based on the first time period and the second time period.

Example 25: The method of any combination of examples 21-24, wherein detecting the plurality of ZVS pulses comprises: detecting, by the controller circuit, when a reflected voltage signal is greater than approximately zero volts; detecting, by the controller circuit, when the reflected voltage signal is greater than a predetermined threshold voltage, wherein the predetermined threshold voltage is greater than zero volts; determining, by the controller circuit, a first amount of time between each instance when the reflected voltage signal momentarily exceeds the predetermined threshold voltage and when the reflected voltage signal becomes less than approximately zero volts; and determining, by the controller circuit, a second amount of time when both: the reflected voltage signal is greater than approximately zero volts; and the reflected voltage signal exceeds the predetermined threshold voltage.

Various examples of the disclosure have been described. These and other examples are within the scope of the following claims.

What is claimed is:

1. A method comprising:
controlling, by a secondary side controller, a diode conduction time by controlling a switching time of a synchronous rectification (SR) switch of an isolated power converter, wherein the isolated power converter comprises a power transformer;
encoding, by the secondary side controller, digital information by modulating a duration of the diode conduction time;
detecting, by a primary side controller of the isolated power converter, the duration of the diode conduction time;
decoding, by the primary side controller, the digital information based on the duration of the diode conduction time.

2. The method of claim 1, wherein the secondary side controller encoding the digital information by modulating diode conduction time is in response to the isolated power converter entering critical conduction mode (CRCM).

3. The method of claim 2, further comprising extending, by the secondary side controller, the duration of the diode conduction time such that the diode conduction time is longer than a threshold duration to encode a digital ONE.

4. The method of claim 3, further comprising sending the digital ONE over two or more switching cycles.

5. The method of claim 3, further comprising setting, by the secondary side controller, the diode conduction time to less than the threshold duration to encode a digital ZERO.

6. The method of claim 1, further comprising:
initiating, by the secondary side controller, zero voltage switching (ZVS) by controlling a switching time of the SR switch to cause a ZVS pulse;
in response to detecting the ZVS pulse, controlling, by the primary controller, a primary side switch with a control signal during a switching period;
in response to sending a final bit of the digital information, withholding, by the secondary side controller, the ZVS pulse; and
in response to receiving the final bit of the digital information and decoding the digital information, controlling the primary side switch with the control signal without detecting the ZVS pulse.

7. The method of claim 6, further comprising: in response to detecting the control signal after withholding the ZVS pulse, determining, the secondary side controller, that the primary side controller of the power converter has decoded the digital information.

8. The system of claim 6, wherein the secondary side controller, in response to determining that:
the secondary side controller has completed sending the digital information and withheld the ZVS pulse; and
the secondary side controller has not detected the control signal, then determining, by the secondary side controller, that the primary side controller did not decode the digital information.

9. The method of claim 1, further comprising:
initiating, by the secondary side controller, zero voltage switching (ZVS) by controlling a switching time of the SR switch;
in response to the isolated power converter entering discontinuous conduction mode (DCM), encoding the digital information by modulating a period between the switching time of the SR switch;
detecting, by the primary side controller, the switching time of the SR switch; and
decoding, by the primary side controller, the digital information based on the modulated period between the switching time of the SR switch.

10. The method of claim 1,
wherein the secondary side controller is electrically coupled to a gate of the SR switch; and wherein the primary side controller is configured to detect the switching time of the SR switch based on a reflected voltage sensed on a primary winding of the power transformer.

11. A device comprising a primary side controller, the primary side controller configured to:
control a primary side switch of an isolated power converter;
detect a duration of a diode conduction time for the isolated power converter;
decode digital information based on the detected duration of the diode conduction time, wherein the digital information comprises a plurality of digital ONEs and a plurality of digital ZEROS;
in response to detecting a zero voltage switching (ZVS) pulse, control the primary side switch to send a control signal during a switching period;
determine whether the decoded digital information is valid; and
in response to determining that the digital information is valid, and that primary side controller has received a final bit of the digital information, control the primary side switch to output the control signal without detecting the ZVS pulse.

12. The device of claim 11, wherein:
to decode a digital ONE, the primary side controller is configured to compare the duration of the diode conduction time to a threshold duration; and
in response to determining that the duration of the diode conduction time exceeds a duration threshold, decode the duration of the diode conduction time as a digital ONE.

13. The device of claim 12, wherein in response to determining that the duration of the diode conduction time is less than the duration threshold, decode the duration of the diode conduction time as a digital ZERO.

14. The device of claim 11, wherein in response to determining that primary side controller received the final bit of the digital information, and determining that the digital information is not valid, the primary side controller is configured to withhold the control signal during the next subsequent switching period after receiving an indication of the final bit of the digital information.

15. A device comprising a secondary side controller configured to control a synchronous rectification (SR) switch of an isolated power converter, wherein the secondary side controller is configured to:
control a diode conduction time of the isolated power converter time by controlling a switching time of the SR switch;
control the diode conduction time in response to the isolated power converter entering critical conduction mode (CRCM); and
encode digital information by modulating a duration of the diode conduction time.

16. The device of claim 15, wherein to encode a digital ONE, the secondary side controller is configured to extend duration of the diode conduction time such that the diode conduction time is longer than a threshold duration.

17. The device of claim 16, wherein the secondary side controller is configured to send the digital ONE over two or more switching cycles.

18. The device of claim 16, wherein to encode a digital ZERO, the secondary side controller is configured to set the diode conduction time to less than the threshold duration.

* * * * *